United States Patent
Chang et al.

(10) Patent No.: US 7,286,563 B2
(45) Date of Patent: Oct. 23, 2007

(54) METHOD FOR RESETTING MAC LAYER ENTITY IN A W-CDMA COMMUNICATION SYSTEM USING HSDPA

(75) Inventors: Jin-Weon Chang, Yongin-shi (KR); Hyeon-Woo Lee, Suwon-shi (KR); Kook-Heui Lee, Songnam-shi (KR); Seong-Hun Kim, Seoul (KR); Sung-Ho Choi, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 1075 days.

(21) Appl. No.: 10/190,806

(22) Filed: Jul. 8, 2002

(65) Prior Publication Data

US 2003/0016698 A1 Jan. 23, 2003

(30) Foreign Application Priority Data

| Jul. 6, 2001 | (KR) | ................................ 2001-40552 |
| Aug. 25, 2001 | (KR) | ................................ 2001-51602 |

(51) Int. Cl.
 *H04B 7/216* (2006.01)
(52) U.S. Cl. ........................................ 370/469; 370/342
(58) Field of Classification Search ................ 370/335, 370/342, 469
 See application file for complete search history.

(56) References Cited

U.S. PATENT DOCUMENTS

| 6,137,804 | A | 10/2000 | Allison et al. |
| 6,862,450 | B2 * | 3/2005 | Mikola et al. .............. 455/438 |
| 2002/0009999 | A1 * | 1/2002 | Lee et al. ................... 455/454 |
| 2002/0107019 | A1 * | 8/2002 | Mikola et al. .............. 455/436 |
| 2002/0196760 | A1 * | 12/2002 | Malomsoky et al. ....... 370/338 |

FOREIGN PATENT DOCUMENTS

| EP | 1 030 484 | 8/2000 |
| JP | 62-169534 | 7/1987 |
| JP | 05-167645 | 7/1993 |
| JP | 06-121001 | 4/1994 |
| WO | WO 00/21253 | 4/2000 |
| WO | WO 01/20938 | 3/2001 |
| WO | WO 02/069547 | 9/2002 |

OTHER PUBLICATIONS

3rd Generation Partnership Project; Technical Specification Group Radio Access Network; RLC Protocol Specification (3G TS 25.322 version 3.0.0).*
Russian Office Action dated Nov. 17, 2003 issued in a counterpart application, namely, Appln. No. 2002118207/09.
"3rd Generation Partnership Project; Technical Specification Group Radio Access Network; High Speed Downlink Packet Access; Overall UTRAN Description", Jun. 2001.
"3rd Generation Partnership Project; Technical Specification Group Radio Access Network; MAC protocol specification", Jun. 2001.
3rd Generation Partnership Project; Technical Specification Group Radio Access Network; RLC protocol specification, Release 1999, 3GPP TS 25.322 v3.7.0 (Jun. 2001).

* cited by examiner

*Primary Examiner*—Brian Nguyen
(74) *Attorney, Agent, or Firm*—The Farrell Law Firm, P.C.

(57) ABSTRACT

A method for resetting a MAC-hs (Medium Access Control-high speed) layer entity in a communication system using HSDPA (High Speed Downlink Packet Access). When an RLC (Radio Link Control) layer entity is reset due to occurrence a protocol error, the system resets both a MAC-hs layer entity of the RLC layer entity and its counterpart RLC, thus preventing unnecessary data transmission.

16 Claims, 18 Drawing Sheets

METHOD FOR RESETTING MAC LAYER ENTITY IN A W-CDMA COMMUNICATION SYSTEM USING HSDPA

PRIORITY

This application claims priority to an application entitled "Method for Resetting MAC Layer Entity in a W-CDMA Communication System Using HSDPA" filed in the Korean Industrial Property Office on Jul. 6, 2001 and assigned Serial No. 2001-40552, and an application entitled "Method for Resetting MAC Layer Entity in a W-CDMA Communication System Using HSDPA" filed in the Korean Industrial Property Office on Aug. 25, 2001 and assigned Serial No. 2001-51602, the contents of both of which are incorporated herein by reference.

BACKGROUND OF THE INVENTION

1. Field of the Invention

The present invention relates generally to a communication system employing HSDPA (High Speed Downlink Packet Access), and in particular, to a method for resetting a MAC-hs (Medium Access Control-high speed) layer entity upon reset of an RLC (Radio Link Control) layer entity.

2. Description of the Related Art

HSDPA refers to an apparatus, method and system for managing HS-DSCHs (High Speed Downlink Shared Channels), i.e., downlink data channels for supporting high-speed downlink packet data transmission, and control channels related thereto in a W-CDMA (Wideband Code Division Multiple Access) communication system. In order to support high-speed packet data transmission, a communication system using the HSDPA has newly introduced an AMC (Adaptive Modulation and Coding) scheme, an HARQ (Hybrid Automatic Retransmission Request) scheme, and an FCS (Fast Cell Select) scheme.

1) AMC Scheme

The AMC scheme is a data transmission scheme for adaptively determining a modulation mode and a coding mode of different data channels according to a channel condition between a Node B and a UE (User Equipment), thereby to increase the overall utilization efficiency of a cell. The AMC scheme has have a plurality of modulation modes and a plurality of coding modes, and modulates and codes data channels by combining the modulation modes and the coding modes. Generally, each of combinations of the modulation modes and the coding modes is called "MCS (Modulation and Coding Scheme)", and there are a plurality of MCSs with level #1 to level #N according to the number of combinations of the modulation modes and the coding modes. In other words, the AMC scheme adaptively determines a level of the MCS according to a channel condition between the Node B and the UE currently wirelessly connected to the Node B, thereby increasing the overall efficiency of the Node B.

2) HARQ Scheme

The HARQ, or N-channel SAW HARQ (N-channel Stop And Wait Hybrid Automatic Retransmission Request) scheme, will be described. In the typical ARQ (Automatic Retransmission Request) scheme, an ACK(acknowledgement signal) and retransmission packet data are exchanged between an UE and an RNC (Radio Network Controller). However, in the HARQ scheme, there have been proposed the following two plans to increase efficiency of the ARQ scheme. In a first plan, the HARQ exchanges data retransmission request and response between the UE and the Node B. In a second plan, the HARQ temporarily stores errored data and then combines it with retransmission data of the corresponding data before transmission. Further, the HARQ scheme exchanges ACK and retransmission packet data between the UE and the MAC of the Node B over the HS-DSCH. In addition, the HSDPA scheme has introduced the N-channel SAW HARQ scheme in order to make up for the shortcomings of the conventional SAW ARQ (Stop And Wait ARQ)scheme. The SAW ARQ scheme transmits the next packet data only after receiving ACK for the previous packet data. Therefore, in some cases, the SAW ARQ scheme should await ACK, though it can presently transmit packet data. The N-channel SAW HARQ scheme increases channel utilization efficiency by continuously transmitting a plurality of data packets before receiving the ACK for the previous packet data. That is, if it is possible to establish N logical channels between the UE and the Node B and identify the N channels according to timing and channel numbers, the UE receiving the packet data can recognize the channel through which the received packet data was transmitted at a certain time, and take necessary measures of, for example, reconfiguring the received packet data in a desired order or soft-combining the corresponding packet data.

3) FCS Scheme

The FCS scheme rapidly selects a cell having a good channel condition among a plurality of cells, when a UE receiving an HSDPA service enters a cell-overlapped region, i.e., a soft handover region. To be specific, if the UE receiving the HSDPA service enters a cell-overlapped region between a first Node B and a second Node B, then the UE establishes radio links to a plurality of the cells, i.e., a plurality of Node Bs. Here, a set of the cells, to which the radio links are established by the UE, is called an "active set". The FCS scheme receives HSDPA packet data from only the cell maintaining the best channel condition among the cells included in the active set, thereby to reduce the overall interference. Here, a cell transmitting the HSDPA packet data for its best channel condition among the cells in the active set is called a "best cell". The UE periodically checks the channel conditions with the cells belonging to the active set. Upon detecting a cell having a channel condition better than that of the current best cell, the UE transmits a best cell indicator to all of the cells in the active set in order to replace the current best cell with a new best cell. The best cell indicator includes an identifier of the selected new best cell. Upon receiving the best cell indicator, the cells belonging to the active set analyze the cell identifier included in the received best cell indicator to determine whether the received best cell indicator is destined for them. The selected best cell transmits packet data to the UE using a HS-DSCH.

Next, a process of resetting an RLC layer in a general communication system employing the HSDPA will be described with reference to FIGS. 1 and 2. In the following description, a MAC layer entity and an RLC layer entity will be referred to as "MAC" and "RLC" for short.

FIG. 1 illustrates a process of resetting an RLC in a general CDMA communication system not employing the HSDPA. Specifically, FIG. 1 illustrates a process of resetting the RLC operating in an AM(acknowledged mode).

Generally, in the system not employing the HSDPA, the RLC manages retransmission of errored data, and the MAC and the physical layer do not participate in the retransmission. However, since the HSDPA applies the HARQ function to the physical layer, the physical layer performs a retransmission control function caused by occurrence of an error, independent of the RLC. An operation of the RLC will be described herein below. An operation mode of the RLC is divided into a TM(transparent mode), an UM(unacknowledged mode), and an AM. The HSDPA operates only in the UM and the AM.

First, a description will be made of an operation of the RLC in the UM. When the UE and the Node B perform retransmission to the RLC in the UM, a sender RLC inserts a header with a SN(sequence number) into respective transmission data packets, and transmits the transmission data packets to a receiver RLC. The receiver RLC then checks the SNs in the received data packets. If the SNs are not in sequence, or if there is a non-received data packet, the receiver RLC discards the received data packets though they are correctly received.

Second, a description will be made of an operation of the RLC in the AM. The sender RLC transmits data packets, into each of which a header with a SN is inserted, to the receiver RLC. The receiver RLC then checks the SNs in the received data packets. If the SNs are not sequential, or if there is a non-received data packet, the receiver RLC sends a retransmission request for the non-received data packet to the sender RLC. Upon receiving the retransmission request from the receiver RLC, the sender RLC retransmits a data packet corresponding to the non-received data packet to the receiver RLC.

FIG. 1 illustrates a process of resetting the RLC operating in the AM. To reset the RLC operating in the AM, HFNIs (Hyper Frame Number Indicators) of peer-to-peer RLCs, i.e., RLC of a UTRAN (UMTS Terrestrial Radio Access Network) and RLC of an UE are synchronized with each other, and after the synchronization, all the data blocks are discarded. The RLC reset procedure is started in a protocol error state, and after determining the RLC reset, a sender RLC 100 transmits a Reset PDU (Protocol Data Unit) to a peer-to-peer RLC, i.e., a receiver RLC 150 (Step 111). Upon receiving the Reset PDU, the receiver RLC 150 resets an RLC variable to an initial value and discards all the received PDUs. After performing the RLC reset process, the receiver RLC 150 transmits a Reset ACK PDU to the sender RLC 100 and ends the RLC reset process (Step 113).

Next, the RLC reset process by the sender RLC 100 and the receiver RLC 150 will be described with reference to a state transition diagram of FIG. 2.

FIG. 2 illustrates an RLC state transition diagram for the RLC reset process of FIG. 1. As illustrated in FIG. 2, in a Null state 200, the RLC can transmit no data. For data transmission, the RLC transits to an ACK Data Transfer Ready state 250 by reconfiguring an RLC in response to a control command from an RRC (Radio Resource Control) layer entity. In the following description, the RRC layer entity will be referred to as "RRC" for short. In the ACK Data Transfer Ready state 250, the RLC can exchange data blocks, and make transition to the Null state 200 in response to a control command from the RRC. When a protocol error occurs in the Null state 200, the RLC transmits an RLC Reset PDU to the counterpart RLC, and then makes transition to a Reset Pending state 270. In the Reset Pending state 270 also, the RLC cannot exchange data, and should receive an RLC Reset ACK PDU from the counterpart RLC in order to reset the state of the RLC and get out of the Reset Pending state 270.

This RLC reset process has been defined to cope with a protocol error in a common W-CDMA communication system not using the HSDPA. However, the use of the HSDPA causes unnecessary data transmission by the MAC. This is because when the HSDPA is used, a new MAC for supporting the HSDPA, i.e., MAC-hs is realized and the MAC-hs performs the HARQ function. That is, for transmission and retransmission of data blocks, the Node B performs a buffering function. Therefore, the data blocks transmitted by the RLC are buffered in the MAC-hs before being transmitted over the radio channel. At this point, if the RLC reset procedure is performed due to a protocol error occurring on the RLC, the data blocks buffered in the MAC-hs before the RLC reset are transmitted to the counterpart MAC-hs through the physical layer. However, when the counterpart MAC-hs, i.e., the receiver MAC-hs, receives the data blocks, the received data blocks are discarded in the receiver RLC by the RLC reset process. Therefore, while the RLC reset process is performed, the data block transmission by the MAC-hs is unnecessary. Further, until the RLC reset process is ended, the data block buffering causes unnecessary use of the memory. In addition, the receiver MAC-hs should also reset retransmission information, for normal operation. This is because when there exists a data block error-detected by the MAC-hs among the data blocks, or PDUs, received from the UTRAN, the MAC-hs should temporarily perform buffering in order to retransmit the error-detected data block. Therefore, the receiver MAC-hs unnecessarily uses the memory and this data block is also unnecessarily transmitted to the receiver RLC, an upper layer.

SUMMARY OF THE INVENTION

It is, therefore, an object of the present invention to provide a method for resetting a MAC-hs upon reset of an RLC in a communication system using HSDPA (High Speed Downlink Packet Access).

It is another object of the present invention to provide a MAC-hs reset method for preventing unnecessary packet data transmission in a communication system using the HSDPA.

It is further another object of the present invention to provide a MAC-hs reset method for preventing unnecessary occupation of a buffering memory by a physical layer in a communication system using the HSDPA.

To achieve the above and other objects, there is provided a method for resetting a MAC-hs layer entity to prevent the MAC-hs layer entity from performing unnecessary transmission/retransmission upon occurrence of an unrecoverable error in an RLC layer entity in a communication system using HSDPA. The system includes (1) an RNC having (i) the RLC layer entity for distinguishing packet data, (ii) a MAC-d (MAC-dedicated) layer entity for multiplexing the distinguished packet data from the RLC layer entity to corresponding dedicated channels, and (iii) a MAC-c/sh (MAC-common/shared) layer entity for multiplexing the distinguished packet data to corresponding common channels, and (2) a Node B having the MAC-hs layer entity for transmitting and retransmitting the multiplexed packet data to a UE at high speed. The multiplexed packet data is transmitted from the Node B to the UE over a corresponding channel. The method comprises resetting the RLC layer entity upon occurrence of the error; and transmitting RLC layer entity reset information indicating reset of the RLC layer entity to the MAC-hs layer entity, and resetting the MAC-hs layer entity.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE
PREFERRED EMBODIMENT

A preferred embodiment of the present invention will be described herein below with reference to the accompanying drawings. In the following description, well-known functions or constructions are not described in detail since they would obscure the invention in unnecessary detail.

First, a structure of a MAC (Medium Access Control) layer entity for a W-CDMA (Wideband Code Division Multiple Access) system using the HSDPA (High Speed Downlink Packet Access) will be described with reference to FIG. 3.

A layer structure of the W-CDMA communication system using the HSDPA is made by modifying an existing layer structure of the W-CDMA communication system not using the HSDPA, since the HARQ (Hybrid Automatic Retransmission Request) function in the MAC layer is required in addition to an SR (Selective Repeat) HARQ function in the RLC (Radio Link Control) layer. The modified layer structure will be separately described for the UE (User Equipment) and the UTRAN (UMTS Terrestrial Radio Access Network). Further, in the following description, the RLC layer entity, the MAC layer entity, and the RRC (Radio Resource Control) layer entity will be referred to as "RLC", "MAC" and "RRC" for short, respectively.

A layer structure of the UE will first be described with reference to FIG. 3.

Figure 1:
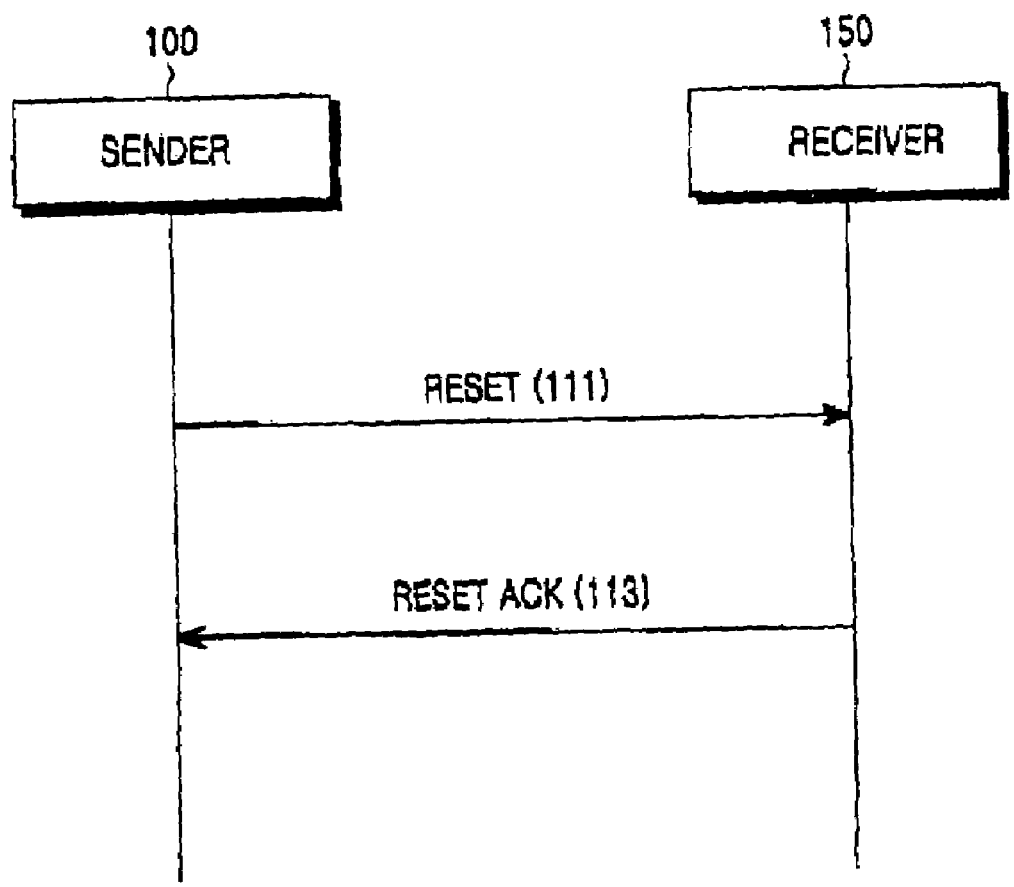
FIG. 1 illustrates a process of resetting an RLC in a general CDMA communication system not employing the HSDPA.
Figure 2:
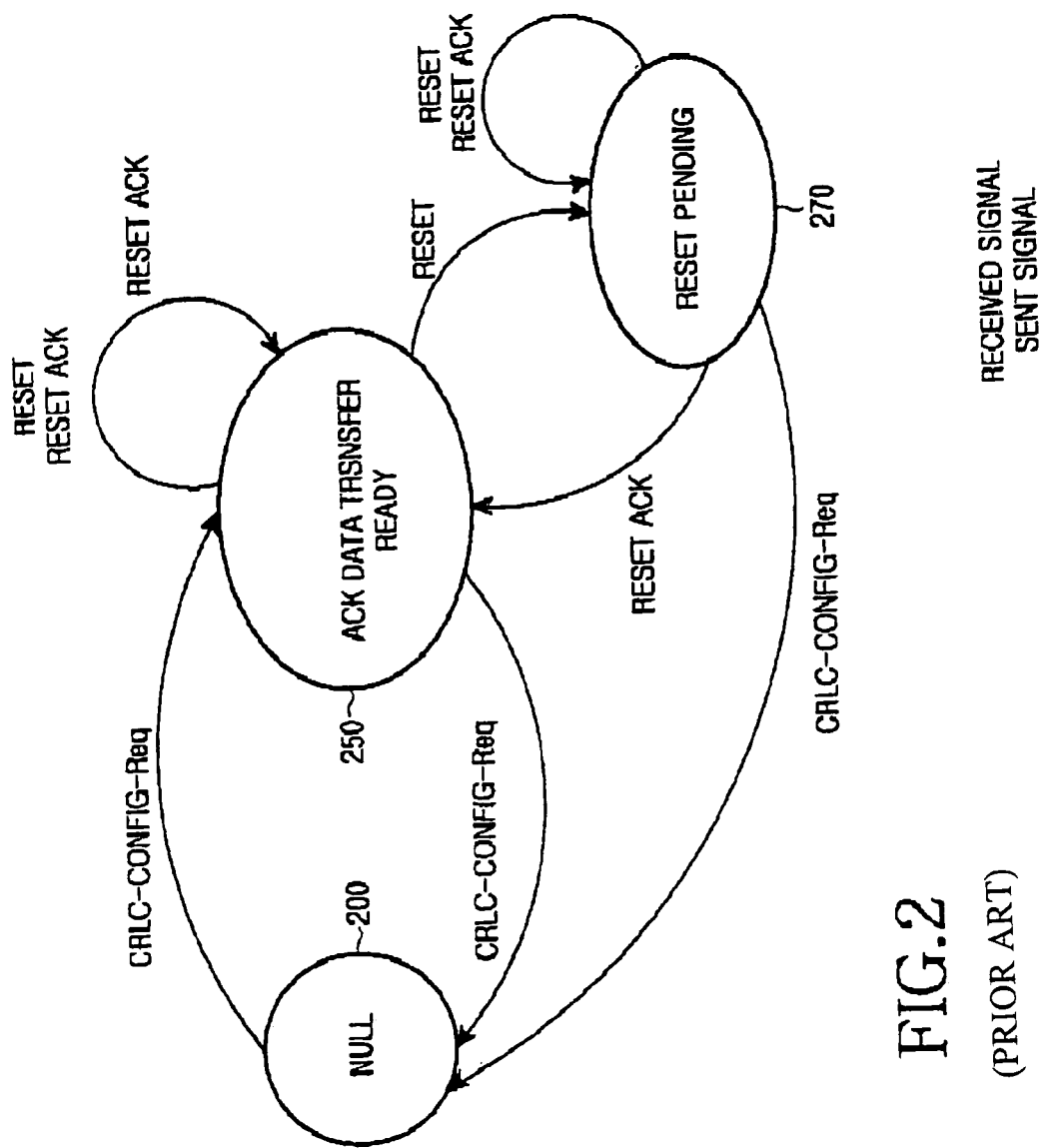
FIG. 2 illustrates an RLC state transition diagram for the RLC reset process of FIG. 1.
Figure 3:
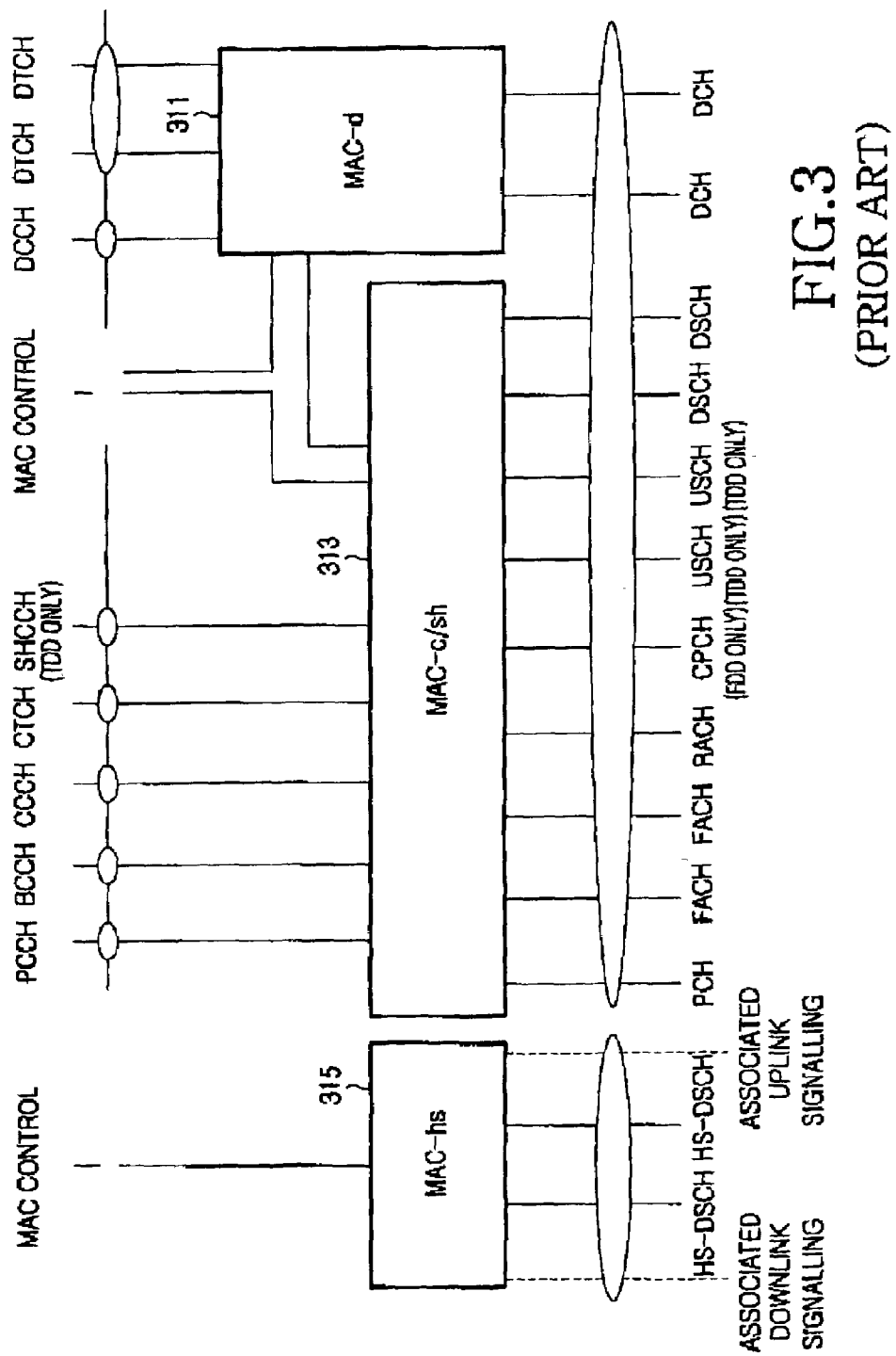
FIG. 3 illustrates a MAC layer structure of the UE in the general W-CDMA communication system using the HSDPA.

FIG. 3 illustrates a MAC layer structure of the UE in the general W-CDMA communication system using the HSDPA. Referring to FIG. 3, a MAC-d (MAC-dedicated) layer entity 311, a MAC layer entity for dedicated channels, performs a MAC function on the dedicated logical channels such as a dedicated control channel (DCCH) and a dedicated traffic channel (DTCH). When mapped to dedicated transport channels, the dedicated logical channels are connected to dedicated channels (DCH). However, when mapped to common channels, the dedicated logical channels are connected to a MAC-c/sh (MAC-common/shared) layer entity 313, a MAC for managing the common channels, without passing through the MAC-d 311. The MAC-c/sh 313, a MAC layer entity for the common channels, manages the common logical channels such as a paging control channel (PCCH), a broadcast control channel (BCCH), a common control channel (CCCH), a common traffic channel (CTCH), and a shared control channel (SHCCH). Further, the MAC-c/sh 313 exchanges data with the MAC-d 311 over the common transport channels such as a paging channel (PCH), a forward access channel (FACH), a random access channel (RACH), a common packet channel (CPCH), an uplink shared channel (USCH), and a downlink shared channel (DSCH). The MAC-d 311 and the MAC-c/sh 313 can receive a control command from an RRC, and send a state report to the RRC. Control information among the MAC-d 311, the MAC-c/sh 313 and the RRC is achieved through MAC control.

The structure of the MAC-d 311 and the MAC-c/sh 313 has already been realized in the layer structure of the conventional W-CDMA communication system, and in order to support the HSDPA, a MAC-hs (MAC-high speed) layer entity 315 has been additionally realized. The MAC-hs 315 has a MAC function supporting the HS-DSCH (High Speed-Downlink Shared Channel) in order to support the HSDPA. The MAC-hs 315 is also controlled by the RRC through the MAC control.

A detailed structure of the MAC-c/sh 313 will be described with reference to FIG. 4.

Figure 4:
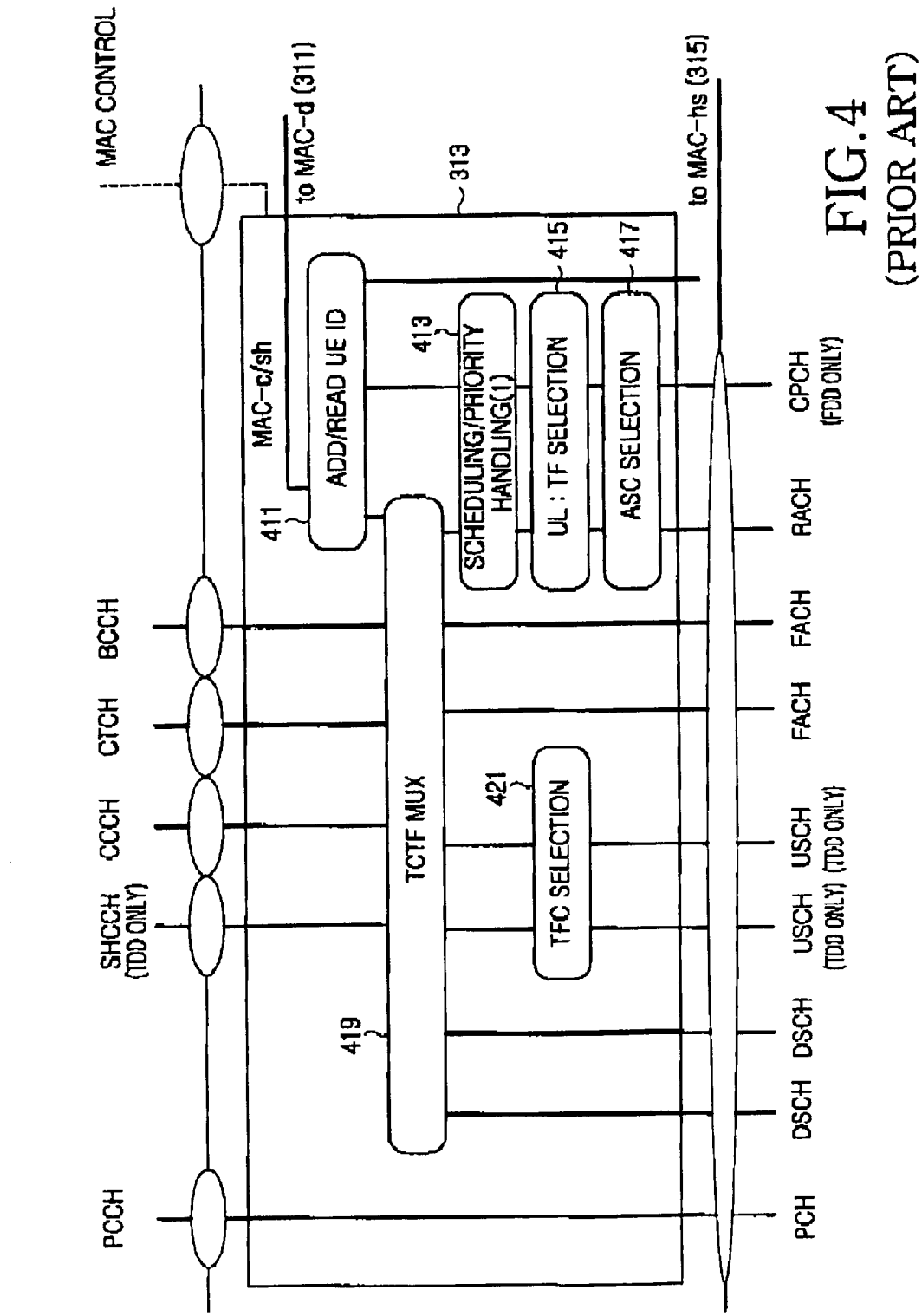
FIG. 4 illustrates a MAC-c/sh layer structure of the UE in the general W-CDMA communication system using the HDSPA.

FIG. 4 illustrates a MAC-c/sh layer structure of the UE in the general W-CDMA communication system using the HDSPA. Referring to FIG. 4, the MAC-c/sh 313 is comprised of a UE ID handling (or add/read UE ID) part 411, a scheduling/priority handling part 413, a TF (Transport Format) selection part 415, an ASC (Access Service Class) selection part 417, a TCTF (Target Channel Type Field) multiplexer 419, and a TFC (Transport Format Combination) selection part 421. The UE ID handling part 411 adds UE ID (Identification) to the data exchanged with the MAC-d 311. Further, the UE ID handling part 411 reads the UE ID and recognizes the read UE ID. The scheduling/priority handling part 413 has a scheduling/priority handling function for transmission of the transport channels RACH and CPCH. The TF selection part 415 has a function of selecting TF for the corresponding transport channel, and the ASC selection part 417 has a function of selecting an ASC. The TCTF multiplexer 419 has a function of multiplexing data to the transport channels by adding header fields for separating the common logical channels. The TFC selection part 421 has a function of selecting TFC during transmission of the transport channel USCH. The MAC-c/sh 313 maintains the intact MAC-c/sh function before the use of the HSDPA, and additionally has a connection function with the MAC-hs 315, in order to support the HSDPA.

A detailed structure of the MAC-hs 315 will be described with reference to FIG. 5.

Figure 5:
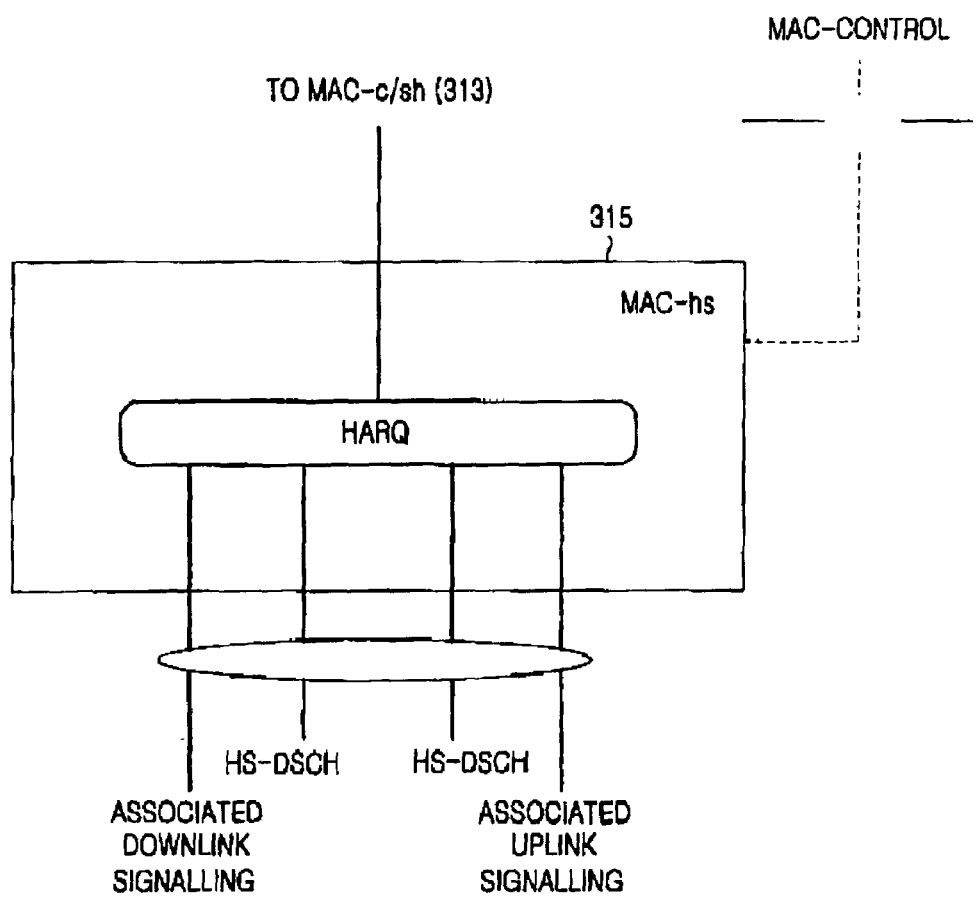
FIG. 5 illustrates a MAC-hs layer structure of the UE in the general W-CDMA communication system using the HSDPA.

FIG. 5 illustrates a MAC-hs layer structure of the UE in the general W-CDMA communication system using the HSDPA. Referring to FIG. 5, the MAC-hs 315 has the HARQ function on the HS-DSCH for supporting the HSDPA, as its major function. The MAC-hs 315 checks an error in the data block received over the radio channel, a physical layer of the Node B. As the result of the error check, if no error is detected from the received data block, i.e., the protocol data unit (PDU) as the packet data, the MAC-hs 315 transmits the received data block and ACK to the MAC-c/sh 313. However, if an error is detected from the received data block, the MAC-hs 315 generates a NACK (Negative ACK) message requesting retransmission of the errored data block and transmits the generated NACK message. Further, the MAC-hs 315 has radio control channels 'Associated Uplink Signaling' and 'Associated Downlink Signaling', in order to transmit and receive UTRAN and HSDPA-related control information. The MAC-hs 315 is also controlled by the RRC.

The layer structure of the UE, especially, the MAC layer structure has been described with reference to FIGS. 3 to 5. Next, a layer structure of the UTRAN will be described with reference to FIGS. 6 to 8.

Figure 6:
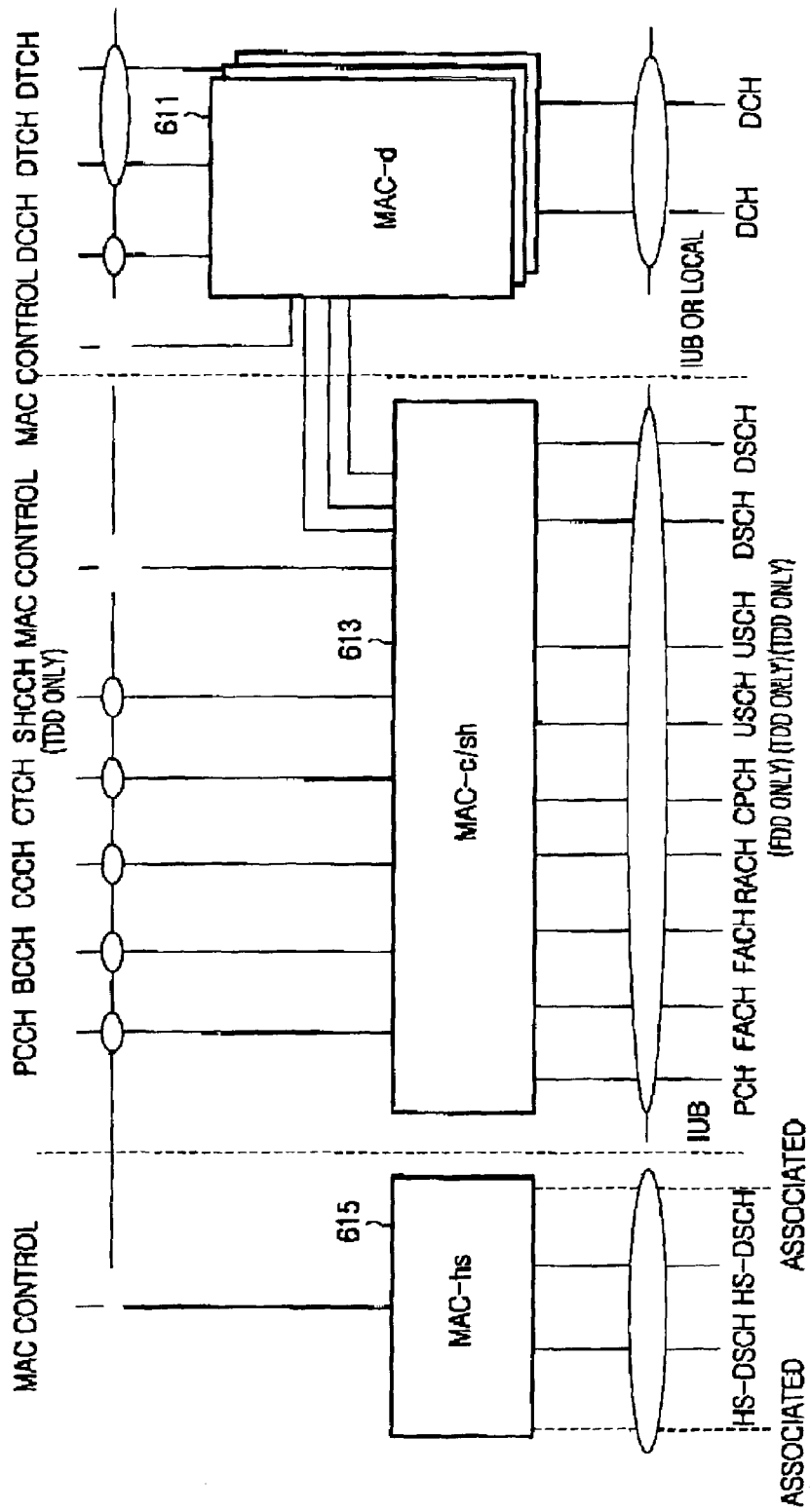
FIG. 6 illustrates a MAC layer structure of the UTRAN in the general W-CDMA communication system using the HSDPA.

FIG. 6 illustrates a MAC layer structure of the UTRAN in the general W-CDMA communication system using the HSDPA. Referring to FIG. 6, like in the UE, a MAC-d 611 transmits data on the dedicated logical channel over the dedicated transport channel DCH, and exchanges data with a MAC-c/sh 613 over the common transport channels such as PCH, FACH, CPCH, USCH and DSCH. The UTRAN has a plurality of the MAC-d's 611 corresponding to the respective UEs, and the MAC-d's 611 are connected in common to the MAC-c/sh 613. The MAC-c/sh 613 is similar to that of the UE in function as described in conjunction with FIG. 3, so the detailed description thereof will not be provided.

Of course, like in the layer structure of the W-CDMA communication system using the HSDPA, the UTRAN also has a new MAC-hs entity 615 in order to support the HSDPA. The MAC-hs 615 is arranged in the Node B, not in the RNC (Radio Network Controller). Therefore, data from the upper layer is transmitted over an Iub interface, an interface between the RNC and the Node B, and a control message for the MAC-hs 615 is also transmitted over the Iub interface.

A detailed structure of the MAC-c/sh 613 will be described with reference to FIG. 7.

Figure 7:
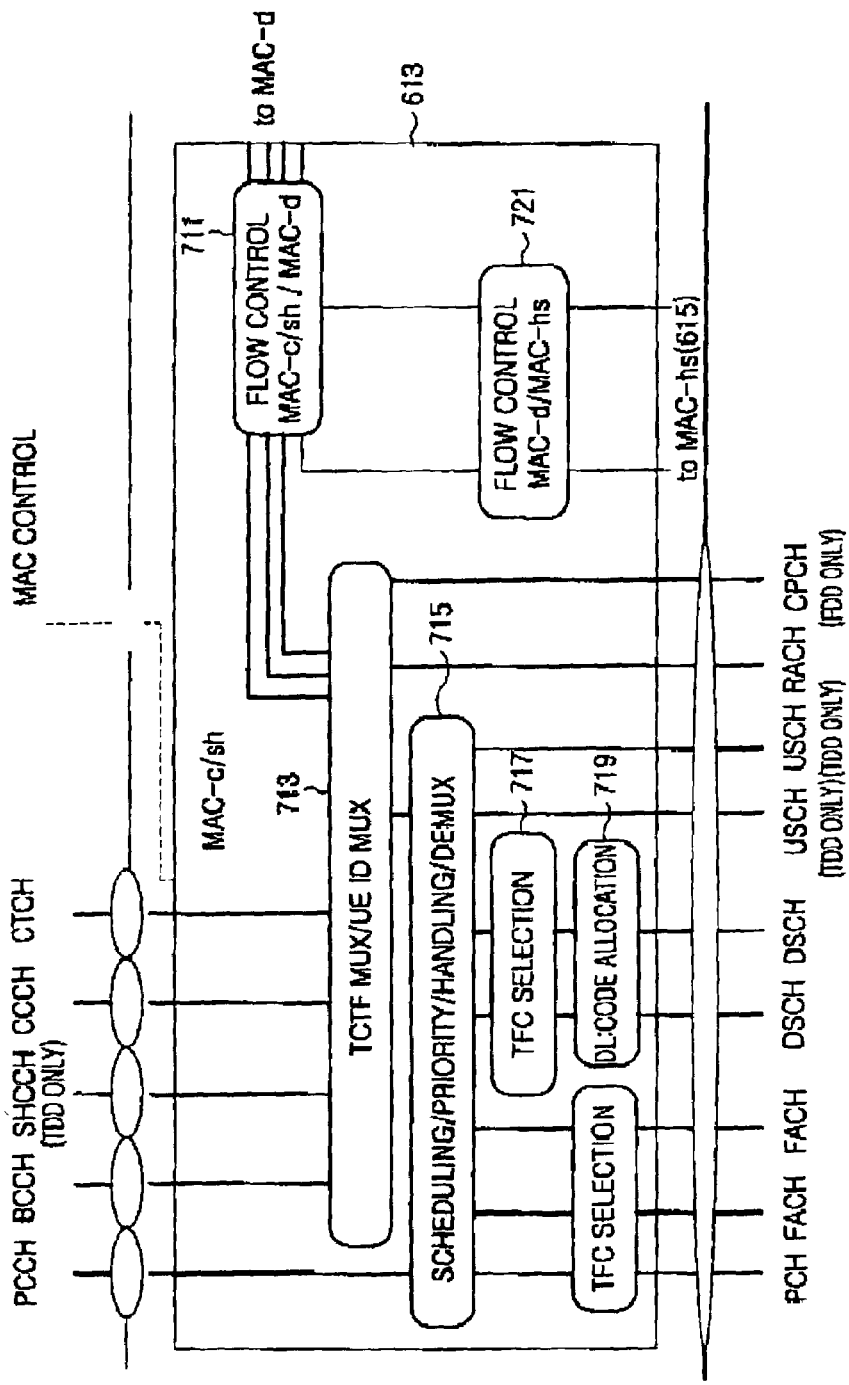
FIG. 7 illustrates a MAC-c/sh layer structure of the UTRAN in the general W-CDMA communication system using the HSDPA.

FIG. 7 illustrates a MAC-c/sh layer structure of the UTRAN in the general W-CDMA communication system using the HSDPA. Referring to FIG. 7, the MAC-c/sh 613 is comprised of a MAC-c/sh/MAC-d flow controller (or Flow Control MAC-c/sh/MAC-d part) 711, a TCTF multiplexer/UE ID multiplexer 713, a scheduling/priority handling part/demultiplexer 715, a TFC selection part 717, a downlink (DL) code allocation part 719, and a MAC-d/MAC-hs flow controller (or Flow Control MAC-d/MAC-hs part) 721. The MAC-c/sh/MAC-d flow controller 711 exchanges data with the MAC-d 611 of FIG. 6. The TCTF multiplexer/UE ID multiplexer 713 distinguishes the common logical channels and the dedicated logical channels from the MAC-d 611, and distinguishes the UEs. The scheduling/priority handling part/demultiplexer 715 performs scheduling/priority handling and demultiplexing on the common transport channels. The TFC selection part 717 performs TFC selection during data transmission over the common transport channels. The DL code allocation part 719 allocates a code used for the downlink channel DSCH. The MAC-d/MAC-hs flow controller 721 controls a path for transmitting the data blocks to the MAC-hs 615 in order to support the HSDPA.

A detailed structure of the MAC-hs 615 will be described with reference to FIG. 8.

Figure 8:
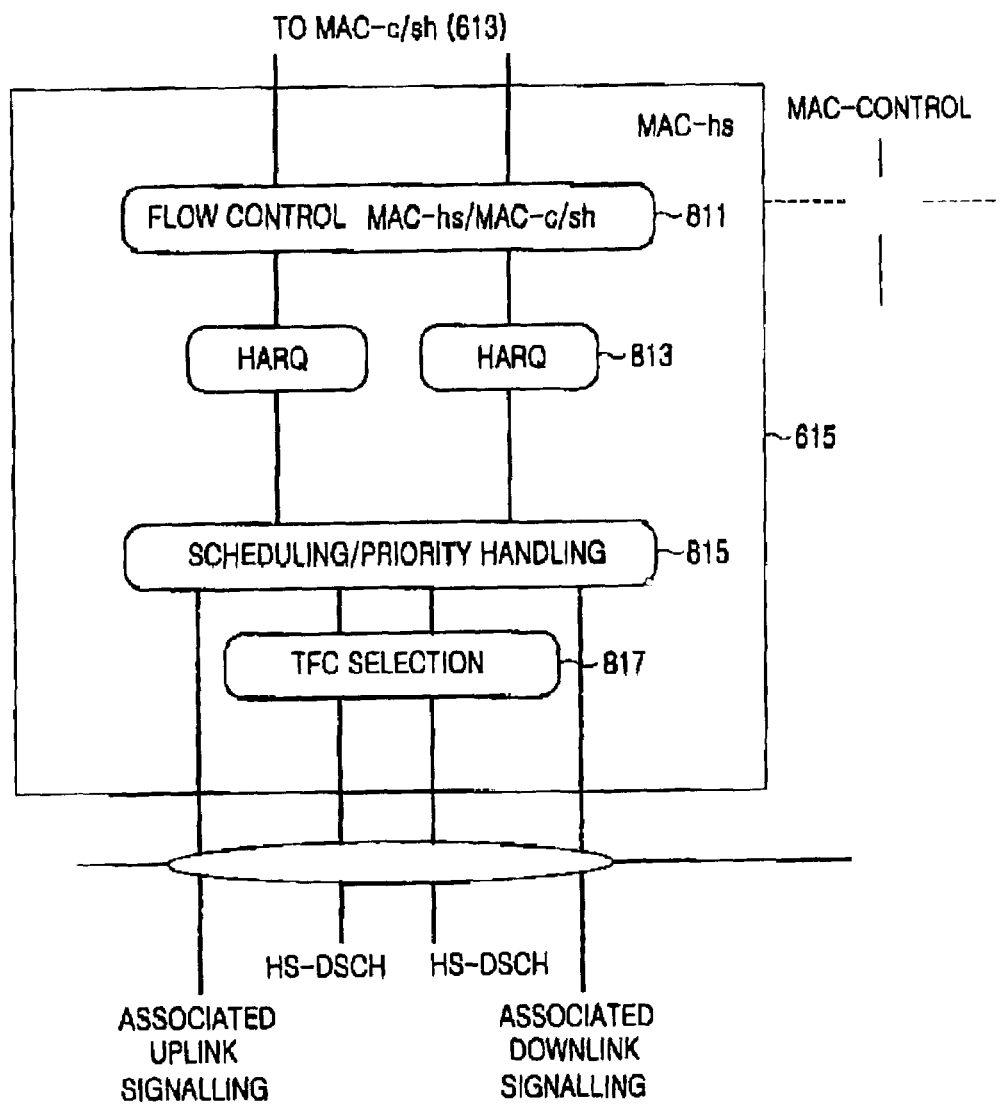
FIG. 8 illustrates a MAC-hs layer structure of the UTRAN in the general W-CDMA communication system using the HSDPA.

FIG. 8 illustrates a MAC-hs layer structure of the UTRAN in the general W-CDMA communication system using the HSDPA. Referring to FIG. 8, the MAC-hs 615 has a function of processing the data blocks on the HS-DSCH, and manages physical channel resources for the HSDPA data. The MAC-hs 615 is comprised of a MAC-hs/MAC-c/sh flow controller 811, a HARQ handling part 813, a scheduling/priority handling part 815, and a TFC selection part 817. The MAC-hs/MAC-c/sh flow controller 811 exchanges data with the MAC-c/sh 613, and the HARQ handling part 813 performs a hybrid automatic retransmission request function on the received data blocks. The scheduling/priority handling part 815 performs scheduling and priority handling on the HS-DSCH, and the TFC selection part 817 performs TFC selection on the common transport channels. Unlike the MAC-d 611 and the MAC-c/sh 613, the MAC-hs 615 is placed in the Node B, and directly connected to the physical layer. Further, the MAC-hs 615 has radio control channels 'Associated Uplink Signaling' and 'Associated Downlink Signaling' for exchanging HSDPA-related control information with the UE over the physical channel.

The MAC layer of the communication system using the HSDPA has been described with reference to FIGS. 3 to 8. Next, a process of reporting occurrence of RLC reset to the MAC-hs will be described with reference to FIG. 9.

Figure 9:
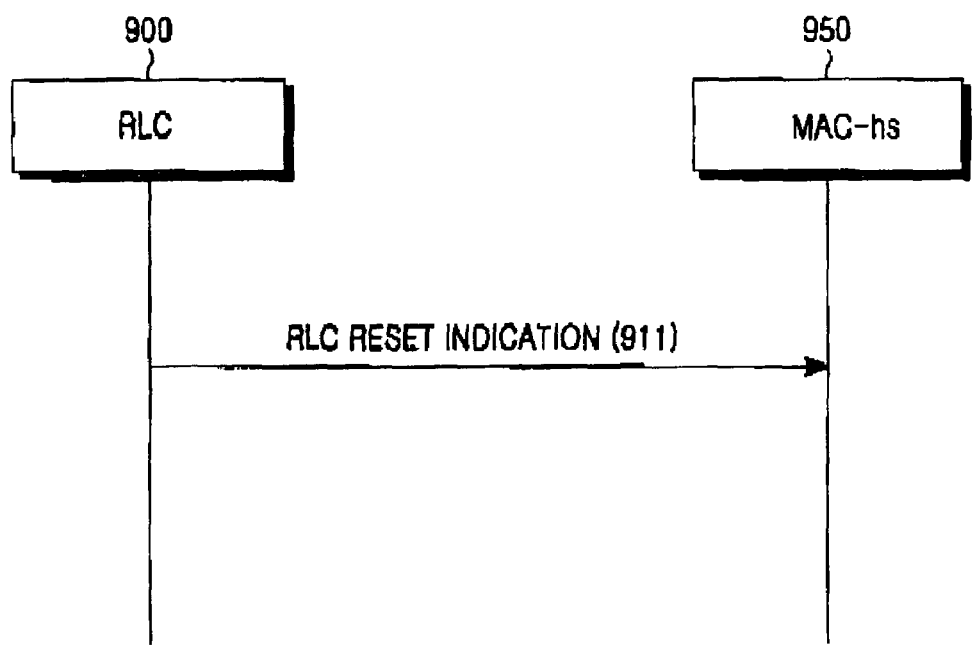
FIG. 9 illustrates a process of reporting occurrence of RLC reset to a MAC-hs layer in a communication system using the HSDPA according to an embodiment of the present invention.

FIG. 9 illustrates a process of reporting occurrence of RLC reset to a MAC-hs layer in a communication system using the HSDPA according to an embodiment of the present invention.

Before a description of FIG. 9 is made, shown in Table 1 are primitives defining control information between RLC and MAC in the conventional communication system not supporting the HSDPA, the primitives being defined in the MAC.

TABLE 1

| Generic | Parameter | | | |
|---|---|---|---|---|
| Name | Request | Indication | Response | Confirm |
| MAC-DATA | Data, BO, UE-ID type indicator, RLC Entity Info | Data, No_TB | | |
| MAC-STATUS | | No_PDU, PDU_Size, TX status | BO, RLC Entity Info | |

Table 1 illustrates primitives defined to transmit data and control information between RLC and MAC in the conventional W-CDMA communication system not supporting the HSDPA. In Table 1, the MAC-DATA primitive, a primitive for exchanging data between the RLC and the MAC, includes a Request field for data transmission from the RLC to the MAC and an Indication field for data transmission from the MAC to the RLC. Further, the Request field of the MAC-DATA can include buffer occupancy (BO) information indicating an occupied capacity of an RLC buffer after data transmission, UE-ID type information, and RLC entity information for TFC selection, and the Indication field can include information on the number No_TB of transport blocks (TBs) of the transmission data. The embodiment of the present invention reports occurrence of RLC reset using the MAC-DATA primitive in the communication system using the HSDPA.

Referring to FIG. 9, the MAC-DATA primitive is used as a primitive for transmitting information indicating reset of an RLC 900 to a MAC-hs 950. The RLC 900 transmits reset information (RLC RESET Indication) indicating reset of the RLC 900 using the Request field of the MAC-DATA primitive (Step 911). Herein, a parameter indicating necessity of resetting the MAC-hs 950 due to the reset of the RLC 900 will be defined as "RESET_info parameter". Although the present invention will be described with reference to an example where reset of the RLC 900 is indicated by adding the RESET_info parameter to the MAC-DATA primitive between the RLC and the MAC in the communication system not using the HSDPA, it is also possible to define a new primitive with the RESET_info parameter, e.g., a MAC-RESET-Request primitive.

Meanwhile, the primitive logically defines control information that should be exchanged between functional entities, and transmission of actual information needs substantial message transmission. In the conventional W-CDMA communication system not using the HSDPA, transmission of the control information is performed within the RNC. However, when the HSDPA is used, the MAC-hs is placed in the Node B, so a message transmission scheme between the RNC and the Node B should be able to instruct the MAC-hs to reset data of the respective UEs upon occurrence of RLC reset. This will be described with reference to FIGS. 10 and 11.

Figure 10:
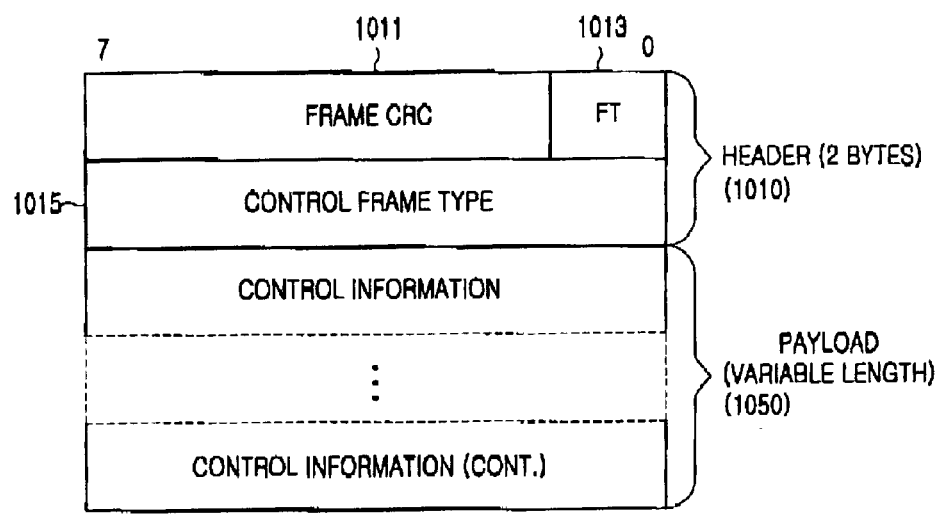
FIG. 10 illustrates a control frame format between the RNC and the Node B, for transmitting RLC reset information according to an embodiment of the present invention.

FIG. 10 illustrates a control frame format between the RNC and the Node B, for transmitting RLC reset information according to an embodiment of the present invention. The embodiment of the present invention realizes a control frame for indicating the MAC-hs reset by modifying the control frame format of the conventional W-CDMA communication system not using the HSDPA. A frame protocol is generally used for a message between the RNC and the Node B, and it is possible to transmit the frame protocol with the RLC reset information. In addition, it is also possible to transmit the RLC reset information using an NBAP (Node B Application Part) protocol, a control information transmission means in a control plane between the RNC and the Node B. Shown in FIG. 10 is a frame protocol format used when transmitting the RLC reset information using the frame protocol.

Referring to FIG. 10, in order to transmit RLC reset information from the RLC of the RNC to the MAC-hs of the Node B, the embodiment of the present invention uses a control frame made by modifying the control frame for the conventional W-CDMA communication system not using the HSDPA. As illustrated in FIG. 10, the control frame for transmitting the RLC reset information is comprised of a 2-byte header 1010 and a payload 1050 with a variable length. The header 1010 is comprised of a Frame CRC field 1011, a Frame Type (FT) field 1013, and a Control Frame Type field 1015. In the general control frame for the conventional W-CDMA communication system not using the HSDPA, there exist a plurality of control frame types on the frame protocol as shown in Table 2 below. Therefore, a control frame for MAC-hs reset caused by the RLC reset, i.e., a control frame for transmitting MAC-hs reset information due to the RLC reset according to an embodiment of the present invention is realized by selecting one of the control frame types shown in Table 2 and modifying the selected control frame type. Instead of transmitting the MAC-hs reset information upon the RLC reset by modifying one of the control frame types, it is possible to construct a control frame for the MAC-hs reset by allocating a new control frame type "MAC-hs reset" to a value "0000 1011".

TABLE 2

| Control Frame Type | Value |
|---|---|
| Timing adjustment | 0000 0010 |
| DL synchronization | 0000 0011 |
| UL synchronization | 0000 0100 |
| DL Node synchronization | 0000 0110 |
| UL Node synchronization | 0000 0111 |
| Dynamic PUSCH assignment | 0000 1000 |
| Timing Advance | 0000 1001 |

In addition, the payload 1050 is comprised of a plurality of Control Information fields. When the control frame of FIG. 10 is used as a control frame for transmitting MAC-hs reset information caused by occurrence of the RLC reset, it is necessary to include the MAC-hs reset information due to the RLC reset in the payload 1050 of the control frame. A payload format with the MAC-hs reset information caused by the RLC reset is illustrated in FIG. 11.

Figure 11:
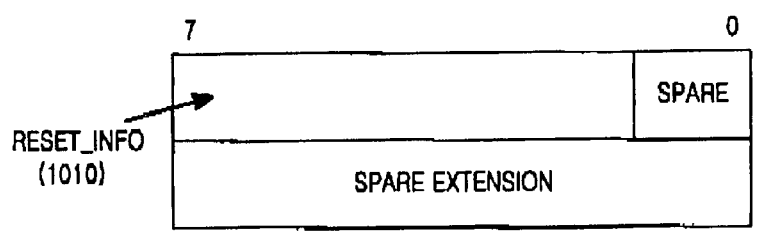
FIG. 11 illustrates a payload format of a control frame for transmitting MAC-hs reset information caused by RLC reset according to an embodiment of the present invention.

FIG. 11 illustrates a payload format of a control frame for transmitting MAC-hs reset information caused by RLC reset according to an embodiment of the present invention. Referring to FIG. 11, it is possible to issue a MAC-hs reset command caused by the RLC reset by transmitting, from the RLC to the MAC-hs, one of the control information fields in the payload 1050 of the control frame shown in FIG. 10 along with a RESET_info field 1111 including the MAC-hs reset control information caused by the RLC reset. Here, the RESET_info field 1111 can include UE ID, UE ID Type, and TB information of data to be discarded.

In addition, when a UE receiving the HSDPA service exists in the handover region, the RLC reset information is required to be transmitted from CRNC (Controlling RNC) of the HS-DSCH to another RNC. In this case also, the control frame of FIG. 10 exists between the RNC to which the UE currently belongs and another RNC to which the UE is to be handed over, and its control frame type is shown in Table 3 below. Here, the control frame is transmitted through the Iur interface between the RNC to which the UE currently belongs and another RNC to which the UE is to be handed over. In this case also, the control frame for MAC-hs reset caused by RLC reset can be realized by modifying a selected one of the control frame types shown in Table 3. Instead of transmitting MAC-hs reset information caused by the RLC reset by modifying one of the existing control frame types, it is possible to reconstruct a control frame by allocating a new control frame type "MAC-hs reset" to a value "0000 0111". In addition, a payload structure of the control frame is also realized in the same manner as described in conjunction with FIG. 10.

TABLE 3

| Control Frame Type | Value |
| --- | --- |
| FACH Flow Control | 0000 0010 |
| FACH Capacity Request | 0000 0011 |
| DSCH Capacity Request | 0000 0100 |
| DSCH Capacity Allocation | 0000 0101 |

Now, a process of performing MAC-hs reset caused by the RLC reset will be described with reference to FIG. 12.

Figure 12:
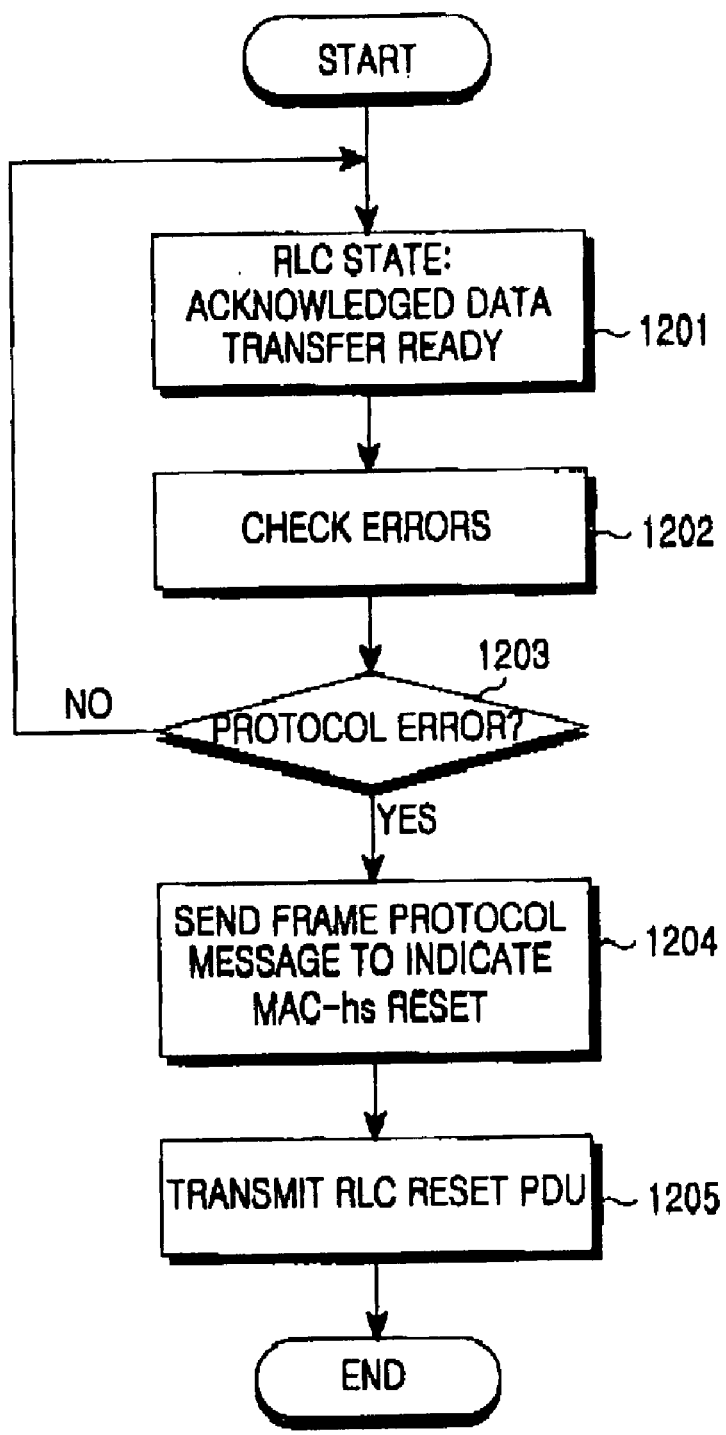
FIG. 12 illustrates a process of performing a MAC-hs reset operation upon RLC reset according to an embodiment of the present invention.

FIG. 12 illustrates a process of performing a MAC-hs reset operation upon RLC reset according to an embodiment of the present invention. A sender RLC in an Acknowledged Data Transfer Ready state in step 1201 checks errors while exchanging data with the counterpart RLC, i.e., a receiver RLC, in step 1202. The sender RLC determines in step 1203 whether a protocol error has occurred. As the result of the determination, if no protocol error has occurred, the sender RLC returns to the Acknowledged Data Transfer Ready state and exchanges data with the receiver RLC. However, if it is determined in step 1203 that a protocol error has occurred, the sender RLC proceeds to step 1204. In step 1204, as RLC reset occurs due to the protocol error, the sender RLC transmits to the sender MAC-hs a frame protocol message indicating occurrence of reset in the sender RLC, i.e., indicating the MAC-hs reset caused by reset of the sender RLC. Then, in step 1205, the sender RLC makes transition to the Reset Pending state after transmitting the MAC-hs reset indication message, and transmits RLC Reset PDU indicating the reset information to the receiver RLC as RLC reset occurs in the sender RLC due to a protocol error, and then ends the process. Here, the sender RLC transmits the RLC Reset PDU to the receiver RLC after a lapse of a prescribed time considering a propagation delay time required in transmitting the MAC-hs reset message from the sender RLC to the MAC-hs, or a time previously predetermined by the sender RLC. The sender RLC counts the predetermined time using a timer included therein. In addition to considering the propagation delay, the sender RLC can transmit the MAC-hs reset message to the MAC-hs a predetermined number of times thereby to maintain accuracy. Upon receiving the frame protocol message indicating occurrence of reset in the sender RLC from the sender RLC, the sender MAC-hs discards transmission data temporarily stored in its internal buffer memory and suspends the HARQ operation, thereby performing reset. Upon receiving the MAC reset signal, the sender MAC-hs first resets the buffer memory of the MAC and then sends the RLC Reset PDU to the receiver MAC-hs.

With reference to FIG. 12, the counterpart RLC reset and MAC-hs reset process caused by the RLC reset has been described. Upon receiving the RLC reset information, the MAC-hs is required to transmit the received RLC reset information to the counterpart MAC-hs for the following reasons. Since the errored received data blocks are stored in the receiver MAC-hs to be combined with the corresponding data blocks to be retransmitted, if the sender MAC-hs is reset, the sender MAC-hs discards the stored data blocks. Therefore, the data blocks stored in the receiver MAC-hs becomes unnecessary and thus are also discarded.

Next, a process of transmitting reset information caused by the RLC reset from the sender MAC-hs to the receiver MAC-hs will be described with reference to FIG. 13.

Figure 13:
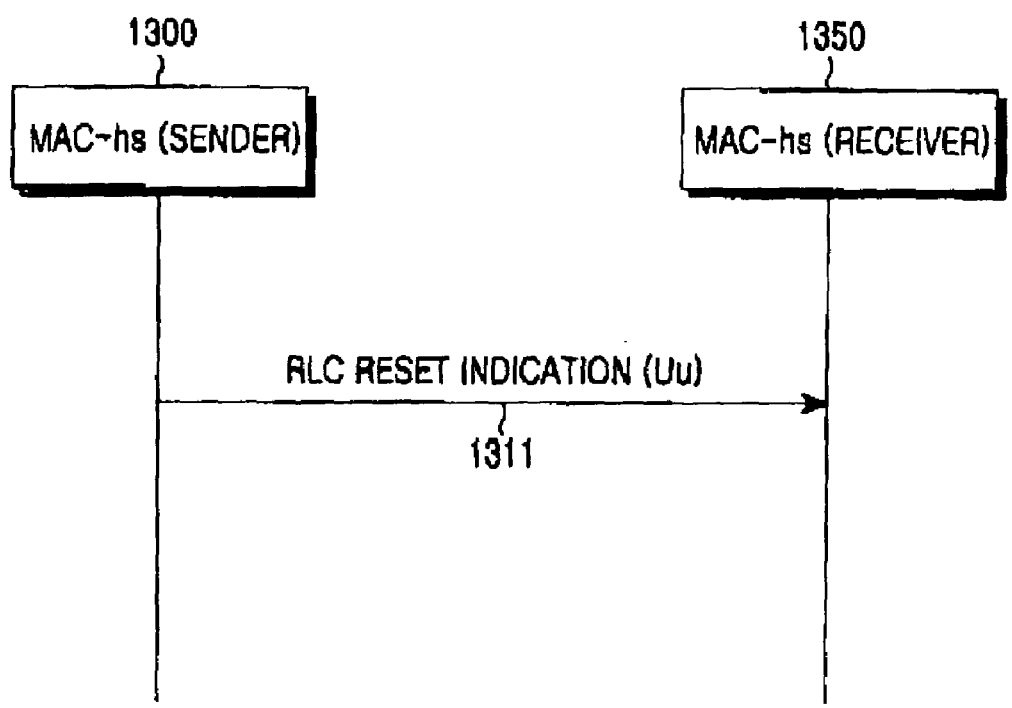
FIG. 13 is a signal flow diagram illustrating a process of transmitting reset information between MAC-hs layers according to an embodiment of the present invention.

FIG. 13 is a signal flow diagram illustrating a process of transmitting reset information between MAC-hs layers according to an embodiment of the present invention. As described above, when the sender MAC-hs is reset due to reset of the sender RLC, all the data blocks stored in the sender MAC-hs are discarded, so the corresponding data blocks stored in the receiver MAC-hs corresponding to the sender MAC-hs become unnecessary and thus are also discarded. Therefore, the receiver MAC-hs should also be reset upon reset of the sender MAC-hs. This will be described in detail herein below. Referring to FIG. 13, a sender MAC-hs 1300 sends reset information (RLC Reset Indication) indicating reset of the sender MAC-hs 1300 to a receiver MAC-hs 1350 through a Uu interface (Step 1311). Upon receiving the reset information, the receiver MAC-hs 1350 discards the corresponding data blocks buffered in its internal memory and then is reset. Here, for the message for transmitting the reset information from the sender MAC-hs 1300 to the receiver MAC-hs 1350, it is possible to (1) modify a MAC signaling message between MACs in the conventional W-CDMA communication system not using the HSDPA, or (2) define a new message for transmitting the reset information from the sender MAC-hs 1300 to the receiver MAC-hs 1350.

The MAC signaling message for transmitting the reset information between the MAC-hs's will be described with reference to FIGS. 14 and 15.

Figure 14:
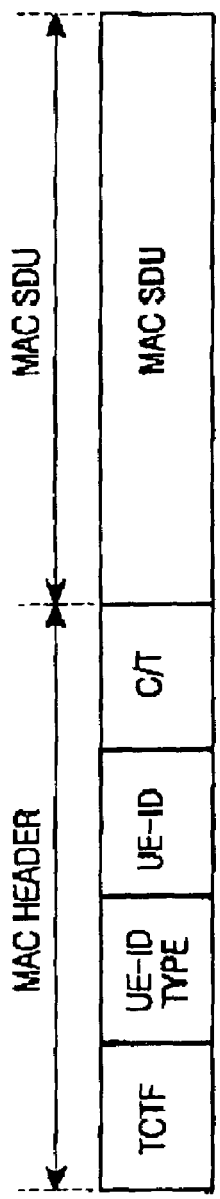
FIG. 14 illustrates a MAC signaling message format in the general communication system not using the HSDPA.

FIG. 14 illustrates a MAC signaling message format in the general communication system not using the HSDPA. Referring to FIG. 14, the RLC segments or concatenates service data units (SDUs) generated from the upper layer in a predetermined unit, and inserts RLC headers therein, thus generating RLC PDUs. The RLC transmits the generated RLC PDUs to the MAC. The MAC then segments or concatenates the received RLC PDUs in a predetermined unit, and inserts MAC headers therein, thus generating TBs. The MAC header is comprised of TCTF, UE-ID Type, UE-ID, and C/T. Here, the TCTF is to distinguish the type of the logical channels. The UE-ID type and the UE-ID indicate the ID type and the ID of the UE, respectively. The C/T is an indicator for distinguishing logical channels in the same transport channel.

The present invention modifies the MAC signaling message between the MACs in the conventional W-CDMA communication system not using the HSDPA, and transmits the reset information between the sender MAC-hs and the receiver MAC-hs using the modified MAC signaling message. The modified MAC signaling message will be described with reference to FIG. 15.

Figure 15:
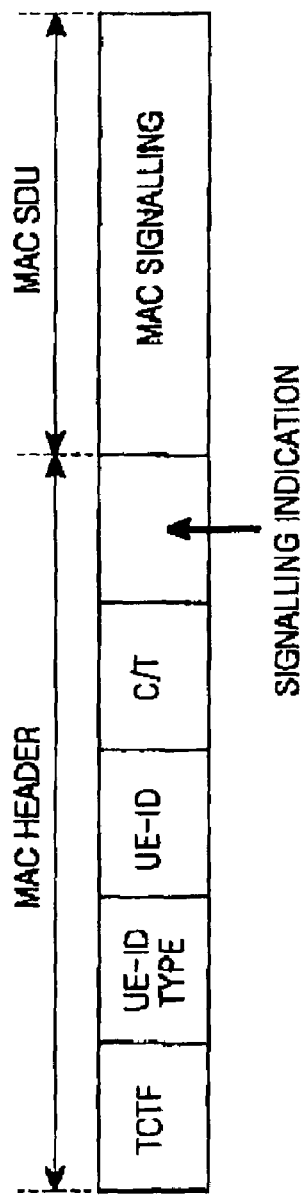
FIG. 15 illustrates a MAC signaling message format for transmitting the MAC-hs reset information according to an embodiment of the present invention.

FIG. 15 illustrates a MAC signaling message format for transmitting the MAC-hs reset information according to an embodiment of the present invention. As illustrated in FIG. 15, the MAC signaling message for transmitting the reset information of the MAC-hs is realized by modifying the MAC signaling message format for the conventional W-CDMA communication system not using the HSDPA.

That is, a Signaling Indication field indicating the MAC-hs reset information is added to the MAC header of the MAC signaling message for the conventional W-CDMA communication system not using the HSDPA. For example, if the Signaling Indication field has a value '1', the MAC SDU includes only the control information for MAC signaling, and the control information included in the MAC SDU field includes an indicator indicating the MAC-hs reset and MAC-hs reset information. Although the Signaling Indication field follows the C/T field in FIG. 15, the position of the Signaling Indication field may be in other positions in the MAC header Next, a process of resetting the MAC-hs using the MAC signaling message for MAC-hs reset defined in FIG. 15 will be described with reference to FIG. 16.

Figure 16:
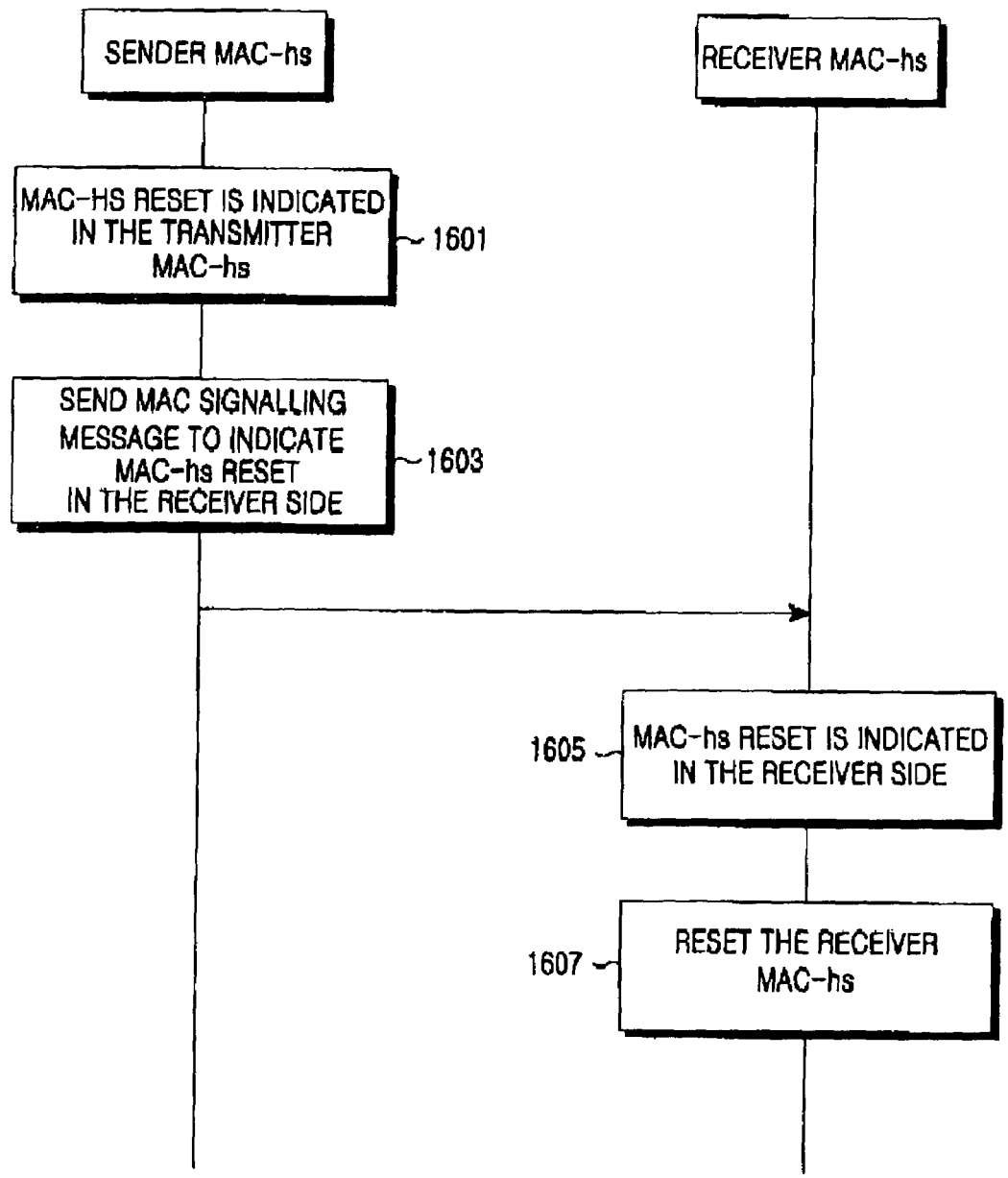
FIG. 16 illustrates a MAC-hs reset process according to an embodiment of the preset invention.

FIG. 16 illustrates a MAC-hs reset process according to an embodiment of the preset invention. First, as illustrated in FIG. 12, if the sender RLC is reset, it transmits MAC-hs Reset Indication information to the sender MAC-hs through a primitive or a control frame (Step 1204). The sender MAC-hs then recognizes the reset indication based on the reset information transmitted from the sender RLC (Step 1601), and transmits the reset information to the receiver MAC-hs using the above-described MAC signaling message (Step 1603). Upon receiving the MAC signaling message indicating the reset information from the sender MAC-hs, the receiver MAC-hs recognizes the reset indication (Step 1605), and then, resets by suspending the HARQ operation and discarding the received data blocks buffered in the internal memory of the receiver MAC-hs.

Another method for resetting the receiver MAC-hs upon reset of the sender RLC will be described with reference to FIG. 17.

Figure 17:
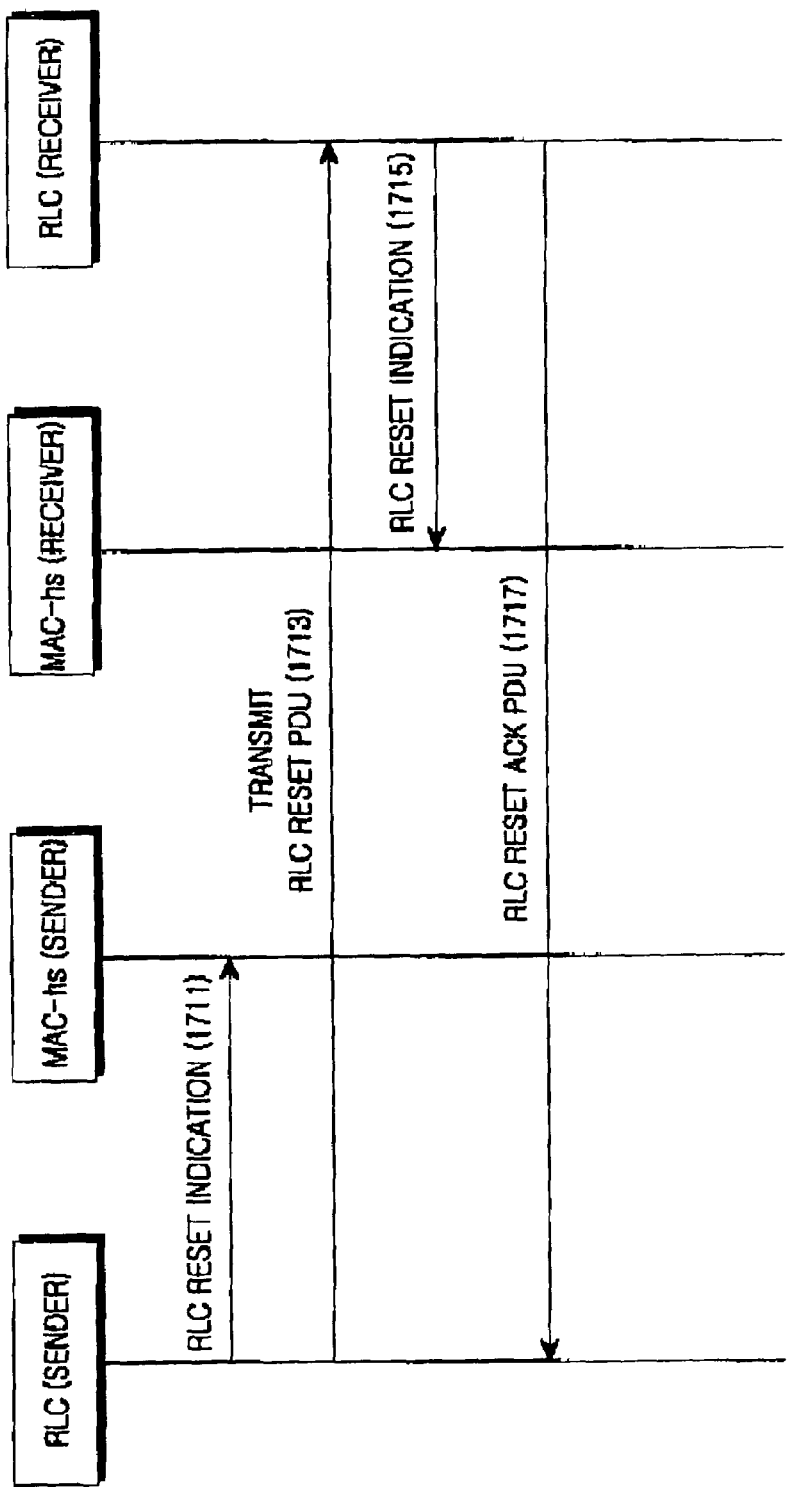
FIG. 17 schematically illustrates a MAC-hs reset process caused by RLC reset according to an embodiment of the present invention.

FIG. 17 schematically illustrates a MAC-hs reset process caused by RLC reset according to an embodiment of the present invention. If the sender RLC is reset, the sender RLC transmits reset information (RLC Reset Indication) indicating reset of the sender RLC to the sender MAC-hs (Step 1711). Here, the reason that the sender RLC first transmits the reset information to the sender MAC-hs is because the sender MAC-hs may discard even the necessary PDU in the reset process upon reset of the sender RLC. The sender RLC transmits the RLC Reset PDU to the receiver RLC after a lapse of a predetermined time considering a propagation delay time required in transmitting the MAC-hs reset information from the sender RLC to the MAC-hs, or a time predetermined by the sender RLC (Step 1713). The sender RLC counts the predetermined time using a timer included therein. Upon receiving the RLC Reset PDU, the receiver RLC recognizes reset of the sender RLC and transmits reset information (RLC Reset Indication) to the receiver MAC-hs to reset the receiver MAC-hs (Step 1715). The receiver RLC can transmit the reset information to the receiver MAC-hs, using the primitive indicating the reset information used between the RLC and the MAC-hs, or the control frame. After being reset, the receiver RLC transmits RLC Reset ACK PDU to the sender RLC in acknowledgement of the RLC Reset PDU (Step 1717).

In the method of resetting the receiver MAC-hs by the receiver RLC upon receiving the RLC Reset PDU from the sender RLC, there are two methods of resetting the sender MAC-hs. A first method is to delete all the data PDUs including the retransmitted data PDUs while resetting the sender MAC-hs. A second method is to continue HARQ retransmission without deleting the currently retransmitting data PDUs.

The two methods are related to resetting the sender MAC-hs, and RLC Reset PDUs are sequentially transmitted to the receiver MAC-hs. Therefore, in the first method, the error-free data PDUs among the data PDUs stored in the receiver MAC-hs can be transmitted to the receiver RLC after a lapse of a limited retransmission time. Thus, even the Reset PDUs, if received successfully through HARQ retransmission, are transmitted to the receiver RLC following the data PDUs. In this case, a delay may occur in transmitting the reset PDUs.

In the second method, the data PDUs being subject to the HARQ retransmission can be successfully received through the continuous HARQ retransmission, and the Reset PDUs can also be successfully received through the HARQ retransmission process. Therefore, after all the data PDUs undergoing HARQ retransmission are successfully retransmitted, the Reset PDUs are transmitted to the receiver RLC. However, the retransmission-passed data PDUs can be transmitted within the limited retransmission time.

A process of resetting the receiver MAC-hs by the receiver RLC as described in conjunction with FIG. 17 will be described with reference to FIG. 18.

Figure 18:
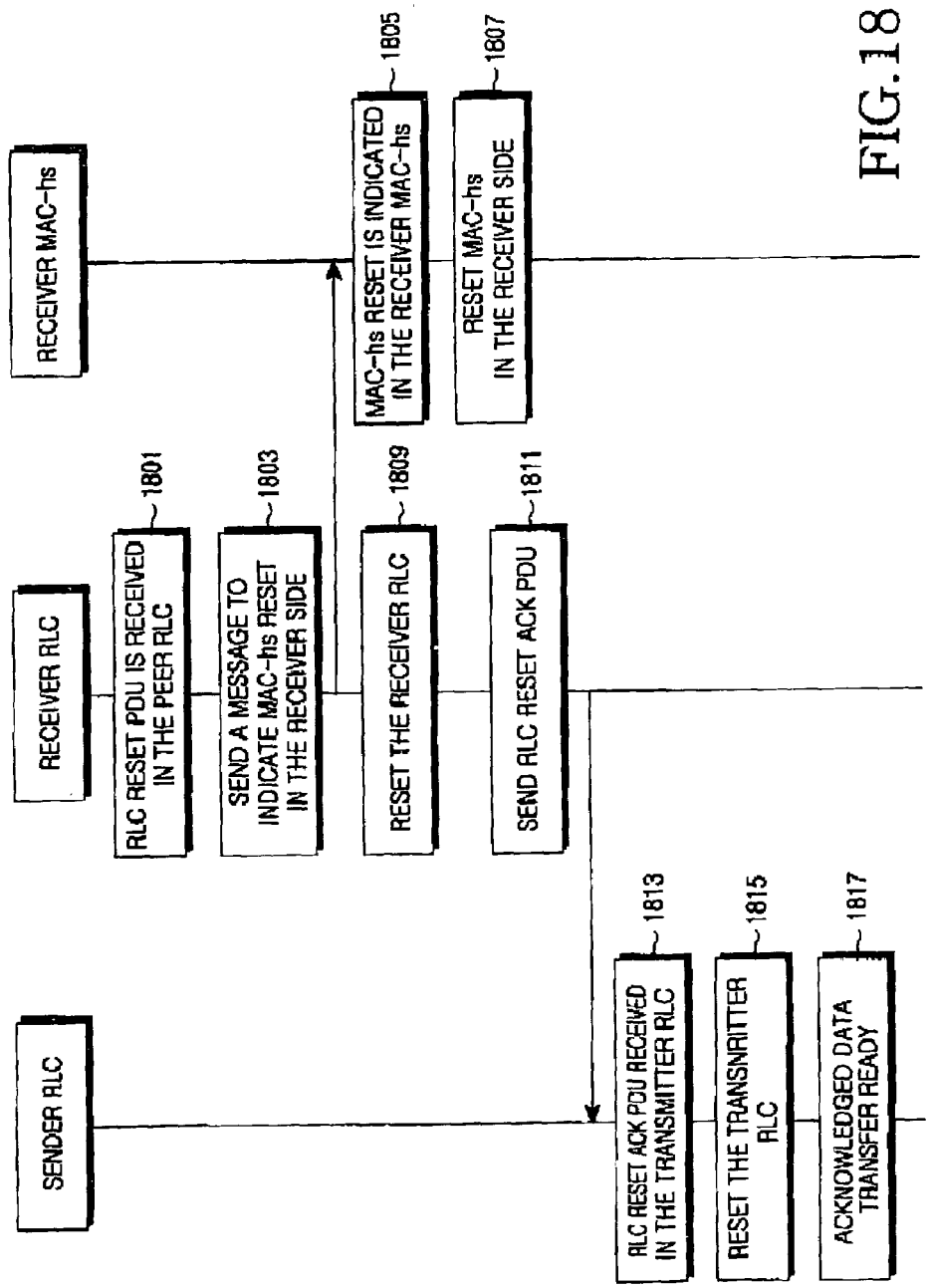
FIG. 18 illustrates a process of resetting the receiver MAC-hs by the receiver RLC according to an embodiment of the present invention.

FIG. 18 illustrates a process of resetting the receiver MAC-hs by the receiver RLC according to an embodiment of the present invention. Referring to FIG. 18, if the sender RLC transmits RLC Reset PDU indicating reset of the sender RLC to the receiver RLC, the receiver RLC receives the RLC Reset PDU (Step 1801). Upon receiving the RLC Reset PDU, the receiver RLC transmits reset information to the receiver MAC-hs to indicate receiver MAC-hs reset (Step 1803). The receiver MAC-hs receives the reset indication of the receiver RLC and recognizes that the receiver MAC-hs should be reset (Step 1805), and suspends HARQ operation and discards the received data blocks buffered in its internal memory, thereby performing MAC-hs reset (Step 1807). Further, since the receiver RLC has received the RLC Reset PDUs, it performs the receiver RLC reset (Step 1809), and after completion of the reset, transmits RLC Reset ACK PDU indicating completion of the receiver RLC reset to the sender RLC (Step 1811). Upon receiving the RLC Reset ACK PDU from the receiver RLC (Step 1813), the sender RLC resets the sender RLC itself (Step 1815). After the sender RLC reset, the sender RLC transitions to the Acknowledged Data Transfer Ready state and normally transmits/receives data (Step 1817).

That is, in the MAC-hs reset method caused by the RLC reset according to the present invention, the RLC indicates to the MAC-hs that the RLC is reset. And the RLC transmits the RLC Reset PDUs according to the RLC reset procedure. Upon receiving the reset indication, the MAC-hs deletes the PDUs buffered in the buffer memory of the corresponding UE. In this case, the MAC-hs must not delete the RLC Reset PDUs received from the upper RLC. Therefore, the method described in FIG. 12 transmits the RLC Reset PDUs after transmitting the indication message indicting the MAC-hs reset.

Meanwhile, the conventional method for MAC-hs transmits the reset message using a control frame between the RNC and the Node B, and transmits the RLC Reset PDU using a data frame, thus requiring two signal flows.

Another method for resetting the MAC-hs is to transmit one message including a MAC-hs reset indication message and the RLC Reset PDUs.

Therefore, the present invention proposes another method of transmitting reset indication from the RLC to the MAC-hs. This method includes the RLC Reset PDU in the payload of the control frame transmitting the MAC-hs reset indication message and transmits it through the same message.

This can be realized by including the RLC Reset PDUs generated on the RLC in the payload in the control frame structure of FIG. 10 between the RLC and the Node B for transmitting the RLC reset information before transmission.

Further another method of transmitting reset indication from the RLC to the MAC-hs is to transmit RLC Reset PDUs using the data frame between the RNC transmitting the RLC Reset PDUs and the Node B, and indicates the MAC-hs reset by designating an indication bit indicating MAC-hs reset to a spare bit reserved for future use.

A method of transmitting the MAC-hs reset indication message and the RLC Reset PDUs through the data frame will be described with reference to FIG. 19.

Figure 19:
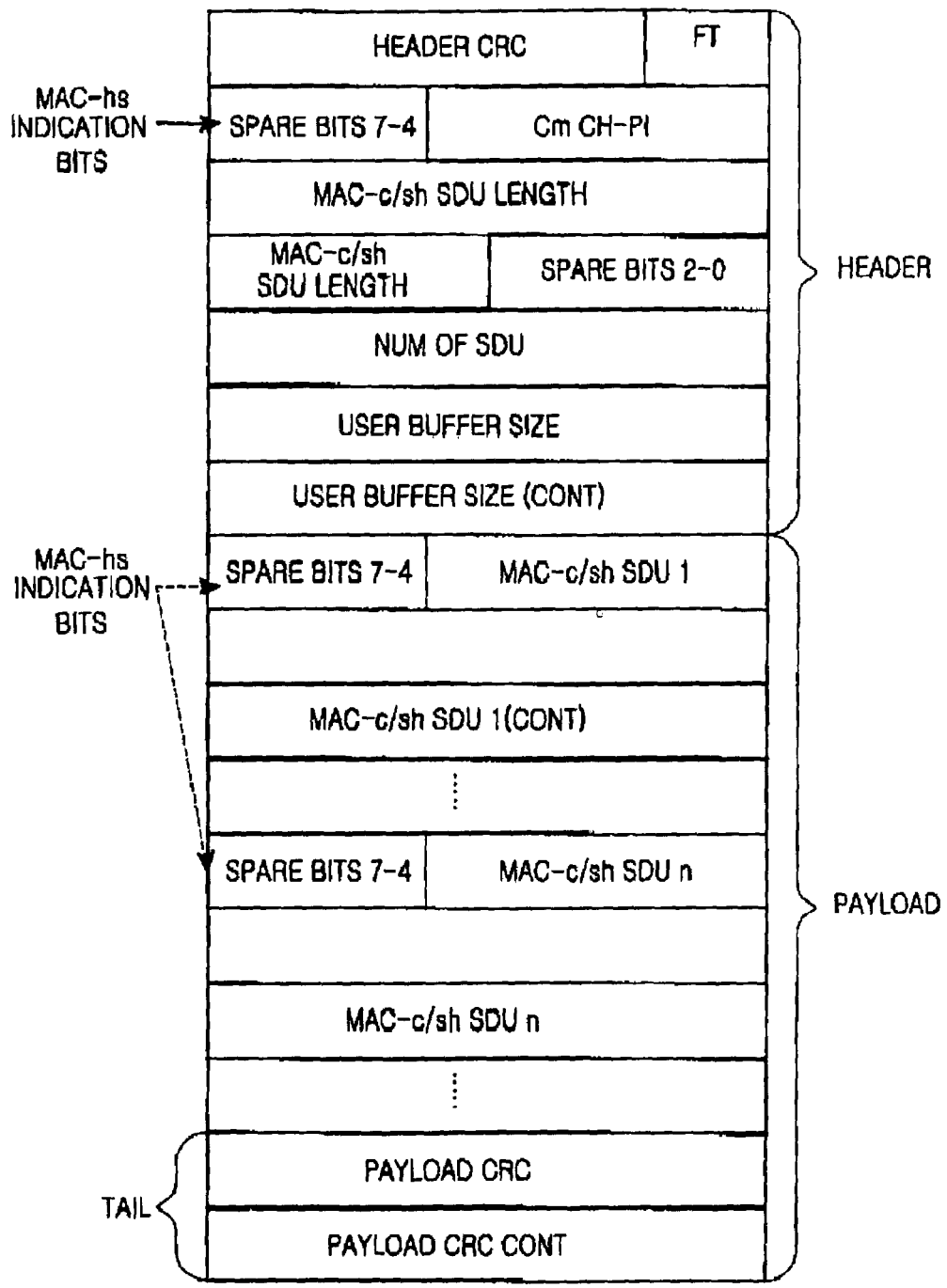
FIG. 19 illustrates a data frame format transmitting the RLC Reset PDUs and the MAC-hs reset indication message.

FIG. 19 illustrates a data frame format transmitting the RLC Reset PDUs and the MAC-hs reset indication message. In the data frame of FIG. 19, Header CRC field is a field for detecting header errors which may occur during transmission, and FT field is a Frame Type field indicating the type of the corresponding frame, i.e., indicating whether the corresponding frame is a data frame or a control frame. In the case of FIG.19, the TF field indicates the data frame. CmCH-PI field is a Common Transport Channel Priority Indicator indicating priority of the channels, MAC-c/sh SDU Length field indicates a length of the transmission data SDU, Num of SDU field indicates the number of the transmission data SDUs, User Buffer Size field indicates a size of the data stored in the buffer of the corresponding channel for the corresponding UE, MAC-c/sh SDU field indicates actual UE data, and Payload CRC field is CRC for detecting errors which may occur during transmission of the payload. The RLC RESET PDU is included in the SDU field of the payload and the MAC-hs reset indication can be allocated to a spare bit of the header or the spare part of each SDU. Of course, the data frame format of FIG. 19 can be realized in a different format, and additional information on the MAC-hs reset can be added to the MAC-hs reset indication message.

Figure 20:
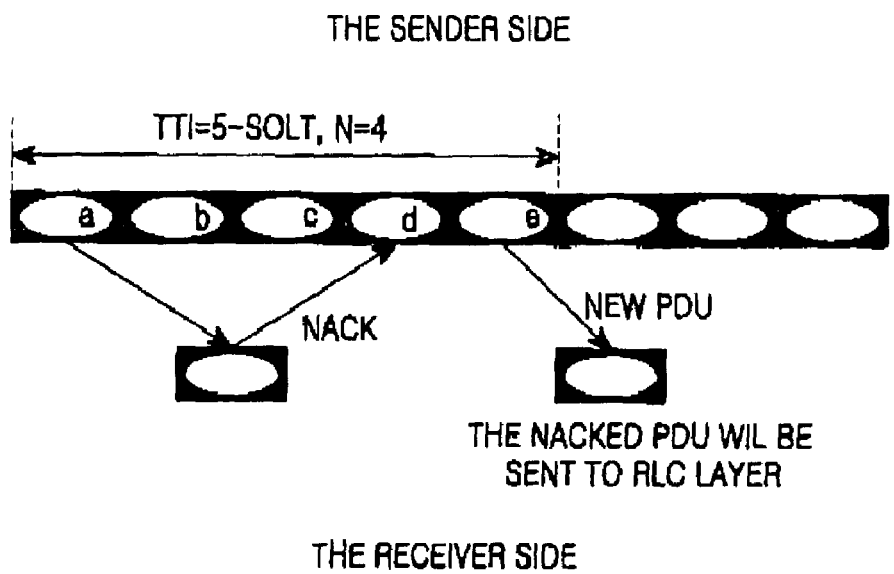
FIG. 20 illustrates an HARQ error handling method for transmitting RLC RESET PDUs to the receiver RLC according to an embodiment of the present invention.

FIG. 20 illustrates an HARQ error handling method for transmitting RLC RESET PDUs to the receiver RLC according to an embodiment of the present invention. Before a description of FIG. 20, the MAC-hs reset process caused by the RLC reset will be mentioned. The method of resetting the receiver MAC-hs by the receiver RLC after receiving the RLC RESET PDU,described in FIG. 17, may have propagation delay according to the sequential PDU transmission rule, and in some cases, will retransmit retransmission PDUs several times. Therefore, in the HARQ error handling method of FIG. 20, the sender MAC-hs transmits the retransmission PDUs of the receiver MAC-hs to the RLC. In the HARQ, the sender distinguishes new transmission and retransmission of the transmission PDU. Here, a flag indicating the new transmission is called a "new flag" and a flag indicating the retransmission is called a "continue flag" In the case of retransmission, i.e., in the case where a NACK message is fed back from the receiver side in response to the transmitted PDU, if an error occurs in the NACK message, the sender side may mis-recognize the errored NACK message as an ACK message. In this case, the sender side transmits the next PDU along with the new flag, and the receiver side decides that an error has occurred in the NACK message and transmits the NACK-ed data PDU to upper RLC. Therefore, it is possible to effectively prevent the propagation delay which occurs when the RLC RESET PDU is transmitted to the RLC through sequential transmission of the retransmission data PDUs, by transmitting new RLC RESET PDU with the continue flag at retransmission when the sender MAC-hs is reset.

In FIG. 20, the description has been made of the case where the sender RLC transmits the RLC RESET PDU with the new flag, so the receiver RLC can immediately process the received RLC RESET PDU, thereby preventing reset delay. Next, another method of transmitting the RLC RESET PDU will be described with reference to FIG. 21.

Figure 21:
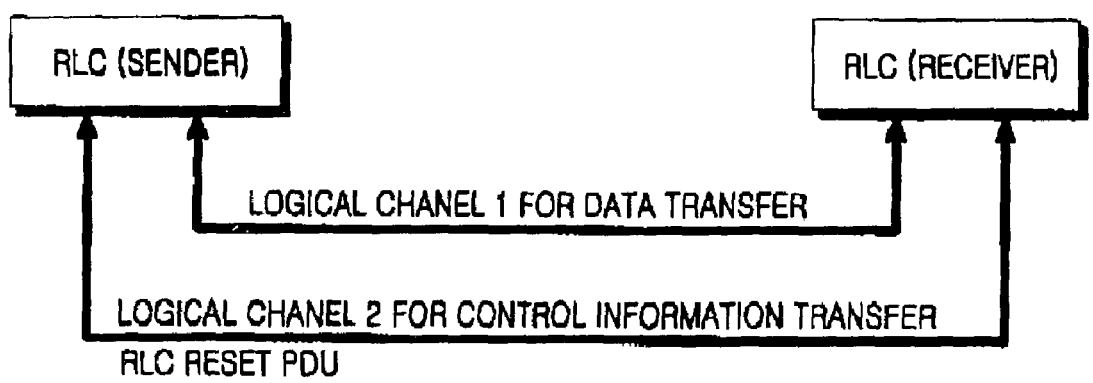
FIG. 21 schematically illustrates a method for transmitting RLC RESET PDU to the receiver RLC using a dedicated channel according to an embodiment of the present invention.

FIG. 21 schematically illustrates a method for transmitting RLC RSET PDU to the receiver RLC using a dedicated channel according to an embodiment of the present invention. Referring to FIG. 21, the RLCs are generated according to radio bearer (RB) to process the data. Therefore, the respective RLCs can have one logical channel for transmission of the data PDU. In this case, the RLCs transmit the data PDU and the control PDU such as the RLC RESET PDU through the logical channels. Alternatively, the RLC can further have a logical channel for transmitting the control PDU in addition to the logical channel for data transmission. In this case, the RLC RESET PDU is transmitted over the logical channel for transmitting the control PDU. The logical channel for the control channel is mapped to an Associated DCH, a dedicated channel established in association with the HS-DSCH, and is not transmitted through the HS-DSCH. Accordingly, it is directly transmitted between the RLCs without observing the sequential data transmission rule with the MAC-hs.

The above method is applied to the case where the RLC reset has occurred in the RNC. When the RLC reset has occurred in the UE, there exist only a case where the RESET PDU is transmitted from the RLC of the UE side to the RLC of the RNC through the Associated DCH. In order to reset the MAC-hs in the case where the RNC RLC transmits RESET ACK PDU to the UE RLC, all the cases of FIGS. 9 to 21 can be applied.

The communication system using the HSDPA according to the present invention resets the counterpart RLC and also resets the MAC-hs, a layer for supporting the HSDPA, when an RLC is reset due to occurrence of a frame protocol error. Therefore, during the RLC reset, the communication system suspends the HARQ operation of the MAC-hs and at the same time, discards the previously received data blocks. Accordingly, it is possible to prevent the MAC-hs from transmitting the unnecessary data when the RLC is reset. By preventing occupation of the radio channel resource due to the unnecessary data transmission, it is possible to effectively manage the radio channel resources. In addition, by resetting the MAC-hs upon reset of the RLC, it is possible to prevent the unnecessary data from being buffered in the MAC-hs, contributing to an increase in utilization efficiency of the memory resources.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for resetting a buffer for retransmission of a MAC (Medium Access Control) layer entity to prevent the MAC layer entity from performing unnecessary transmission upon occurrence of an unrecoverable error in an RLC (Radio Link Control) layer entity in a communication system, the method comprising the step of:

detecting the occurrence of the error by the RLC (Radio Link Control) layer entity;

requesting reset of the buffer of the MAC layer entity based on the detected error; and discarding the data of the buffer of the MAC layer entity in response to the requested reset.

2. A method for resetting a first buffer for retransmission of a MAC (Medium Access Control) layer entity to prevent the MAC layer entity from performing unnecessary transmission upon occurrence of an unrecoverable error in an RLC (Radio Link Control) layer entity in a communication system, the method comprising the step of:

detecting the occurrence of the error by the RLC (Radio Link Control) layer entity;

requesting reset of the first buffer of the MAC layer entity based on the detected error;

discarding the data of the first buffer of the MAC layer entity in response to the requested reset; and requesting reset of a second buffer of a counterpart MAC layer entity.

3. A method for resetting a MAC-hs (Medium Access Control-high speed) layer entity to prevent the MAC-hs layer entity from performing unnecessary transmission/retransmission upon occurrence of an unrecoverable error in an RLC (Radio Link Control) layer entity in a communication system using HSDPA (High Speed Downlink Packet Access), the system including (1) an RNC (Radio Network Controller) having (i) the RLC layer entity for distinguishing packet data, (ii) a MAC-d (MAC-dedicated) layer entity for multiplexing the distinguished packet data from the RLC layer entity to corresponding dedicated channels, and (iii) a MAC-c/sh (MAC-common/shared) layer entity for multiplexing the distinguished packet data to corresponding common channels, and (2) a Node B having the MAC-hs layer entity for transmitting and retransmitting the multiplexed packet data to a user equipmen (UE) at high speed, wherein the multiplexed packet data is transmitted from the Node B to the UE over a corresponding channel, the method comprising the steps of:

resetting the RLC layer entity upon occurrence of the error; and transmitting RLC layer entity reset information indicating reset of the RLC layer entity to the MAC-hs layer entity, and resetting the MAC-hs layer entity based on the RLC entity reset information.

4. The method as claimed in claim 3, wherein the RLC layer entity reset information is transmitted through a primitive between the RLC layer entity and one of the MAC-d and the MAC-c/sh layer entity.

5. The method as claimed in claim 3, wherein the RLC layer entity reset information is transmitted through a frame of a frame protocol.

6. The method as claimed in claim 3, further comprising the step of transmitting reset information from the RLC layer entity to a counterpart RLC layer entity after a lapse of a predetermined time after transmitting the RLC layer entity reset information to the MAC-hs layer entity.

7. The method as claimed in claim 6, wherein the predetermined time is set by considering a propagation delay time required in transmitting the RLC layer entity reset information.

8. The method as claimed in claim 6, wherein the RLC layer entity transmits the RLC layer entity reset information to the counterpart RLC layer entity over a dedicated channel.

9. The method as claimed in claim 6, wherein the RLC layer entity transmits a protocol data unit (PDU) indicating the RLC layer entity reset information to the counterpart RLC layer entity along with a new flag.

10. A method for resetting a MAC-hs (Medium Access Control-high speed) layer entity to prevent the MAC-hs layer entity from performing unnecessary transmissionlretransmission upon occurrence of an unrecoverable error in an RLC (Radio Link Control) layer entity in a communication system using HSDPA (High Speed Dowulink Packet Access), the system including (1) an RNC (Radio Network Controller) having (i) the RLC layer entity for distinguishing packet data, (ii) a MAC-d (MAC-dedicated) layer entity for multiplexing the distinguished packet data from the RLC layer entity to corresponding dedicated channels, and (iii) a MAC-c/sh (MAC-common/shared) layer entity for multiplexing the distinguished packet data to corresponding common channels, and (2) a Node B having the MAC-hs layer entity for transmitting and retransmitting the multiplexed packet data to a user equipment (UE) at high speed, wherein the multiplexed packet data is transmitted from the Node B to the UE over a corresponding channel, the method comprising the steps of:

resetting the RLC layer entity upon occurrence of the error;

transmitting RLC layer entity reset information indicating reset of the RLC layer entity to the MAC-hs layer entity; and resetting the MAC-hs layer entity based on the RLC layer entity reset information, and transmitting MAC-hs layer entity reset information indicating reset of the MAC-hs layer entity from the MAC-hs layer entity to a counterpart MAC-hs layer entity.

11. The method as claimed in claim 10, wherein the MAC-hs entity reset information is transmitted through a MAC signaling message.

12. The method as claimed in claim 11, wherein the MAC signaling message includes (i) a header having a signaling indication indicating that the MAC signaling message includes only MAC layer entity reset information, and (ii) a reset indication indicating reset based on the MAC-hs layer entity reset information.

13. The method as claimed in claim 10, further comprising the step of transmitting the RLC layer entity reset information from the RLC layer entity to the counterpart RLC layer entity after a lapse of a predetermined time after transmitting the RLC layer entity reset information to the MAC-hs layer entity.

14. The method as claimed in claim 13, wherein the predetermined time is set by considering a propagation delay time required in transmitting the RLC layer entity reset information.

15. The method as claimed in claim 13, wherein the RLC layer entity transmits the RLC layer entity reset information to the counterpart RLC layer entity over a dedicated channel.

16. The method as claimed in claim 13, wherein the RLC layer entity transmits a protocol data unit (PDU) indicating the RLC layer entity reset information to the counterpart RLC layer entity along with a new flag.

* * * * *